Feb. 16, 1965 H. A. POWERS 3,169,329
TURNSTILE

Filed May 31, 1962 11 Sheets-Sheet 1

INVENTOR.
HOWARD A. POWERS
BY
*Salter & Michaelson*
ATTORNEYS

Feb. 16, 1965  H. A. POWERS  3,169,329
TURNSTILE
Filed May 31, 1962  11 Sheets-Sheet 2

INVENTOR.
HOWARD A. POWERS
BY
*Salter & Michaelson*
ATTORNEYS

INVENTOR.
HOWARD A. POWERS
BY
ATTORNEYS

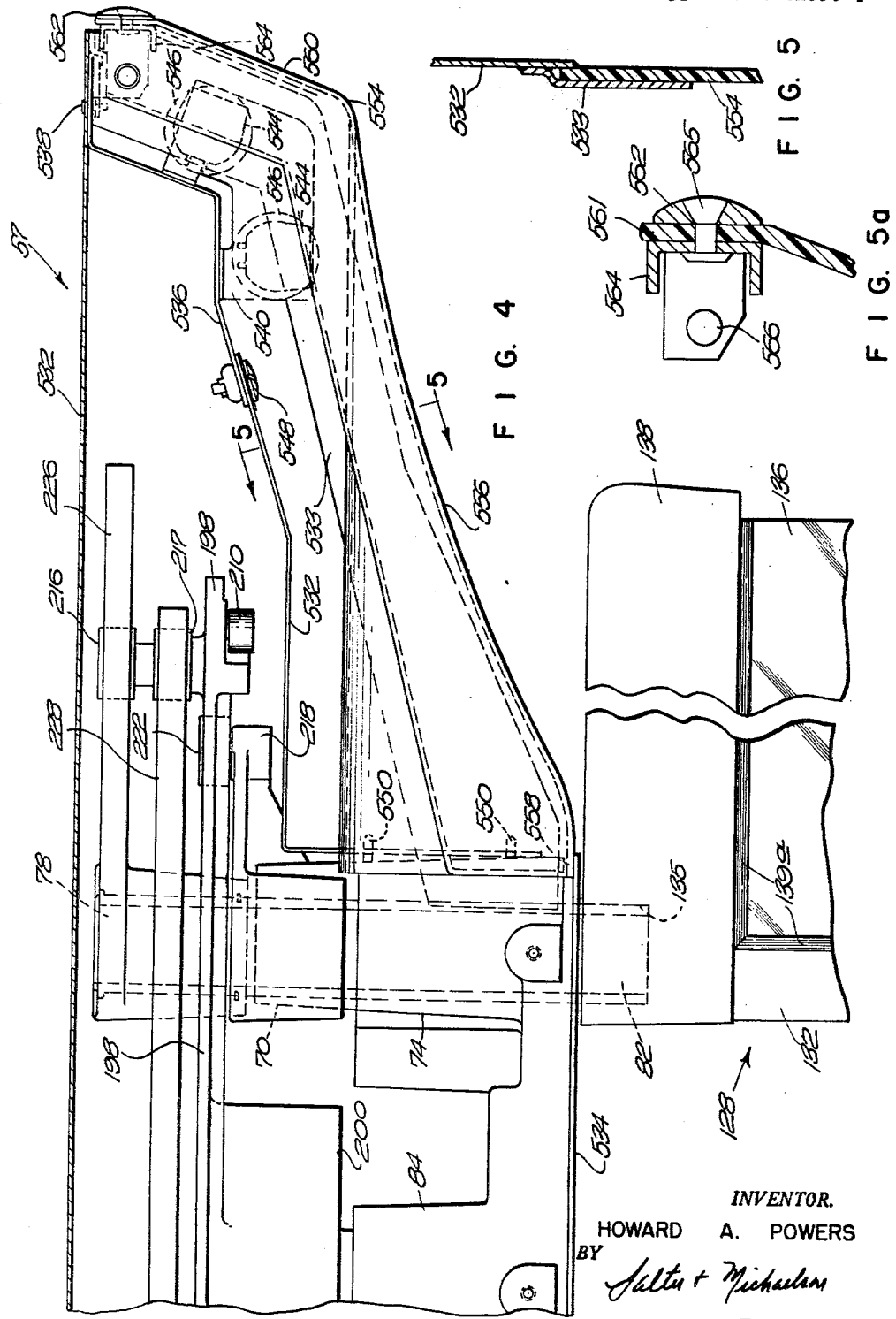

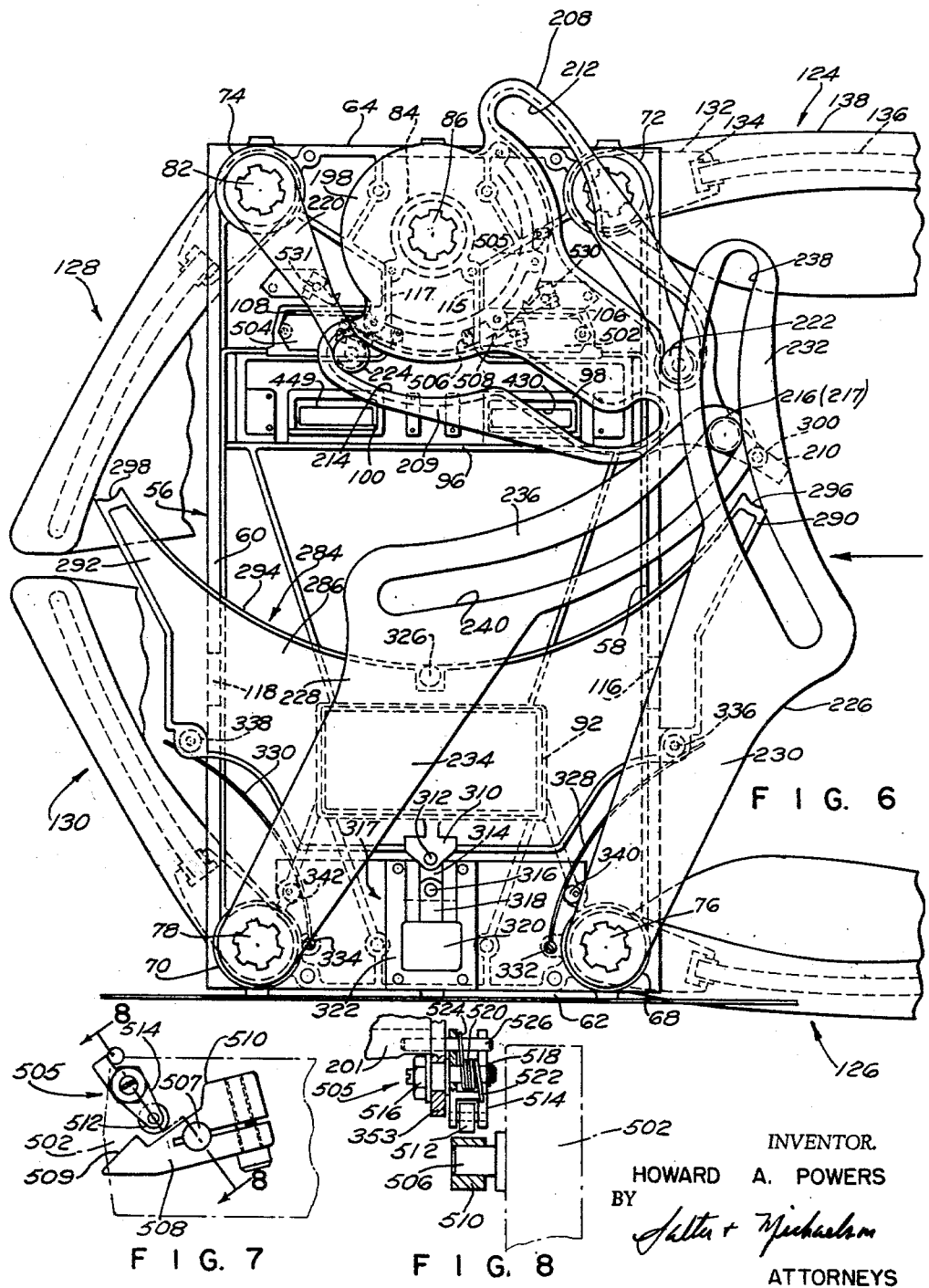

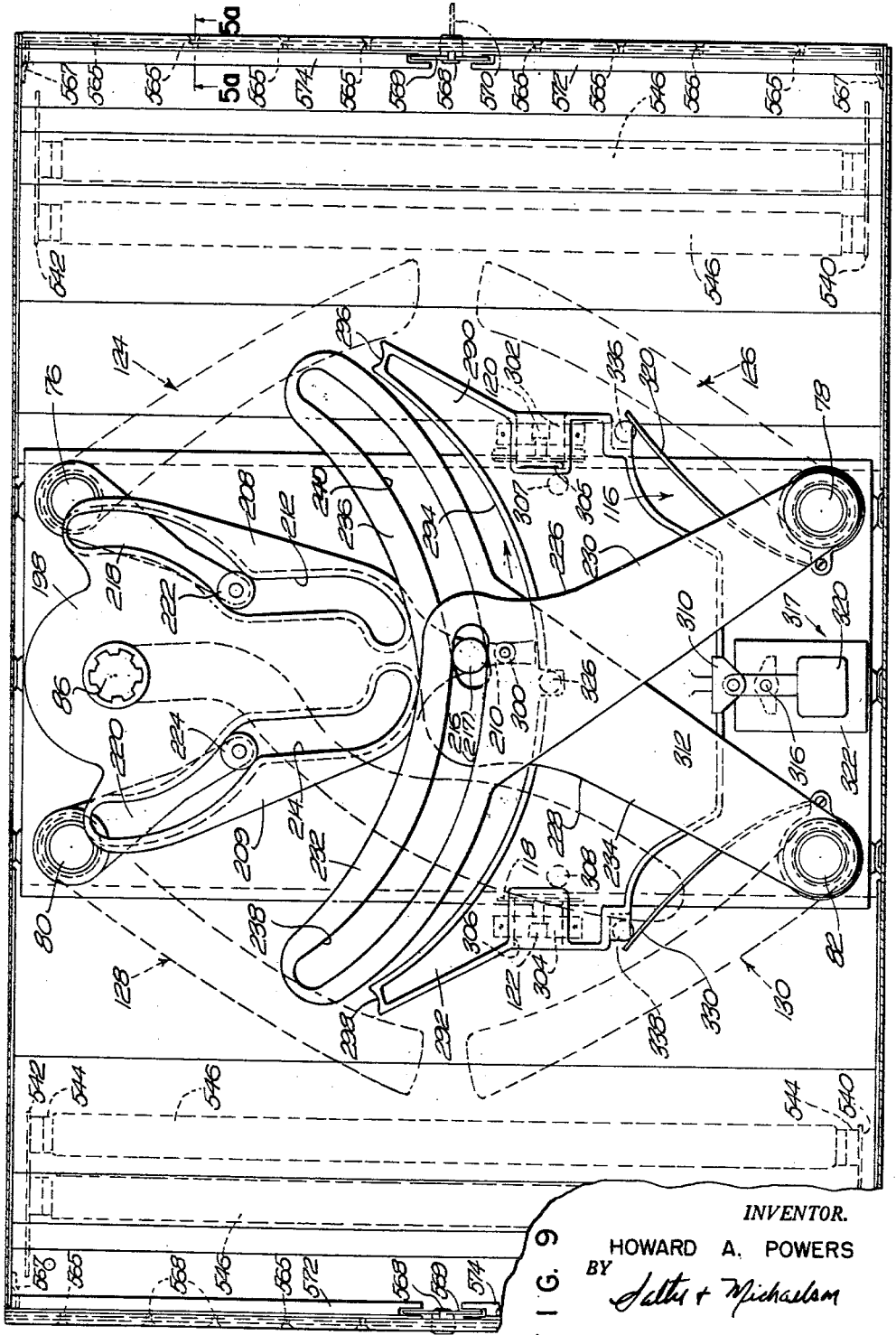

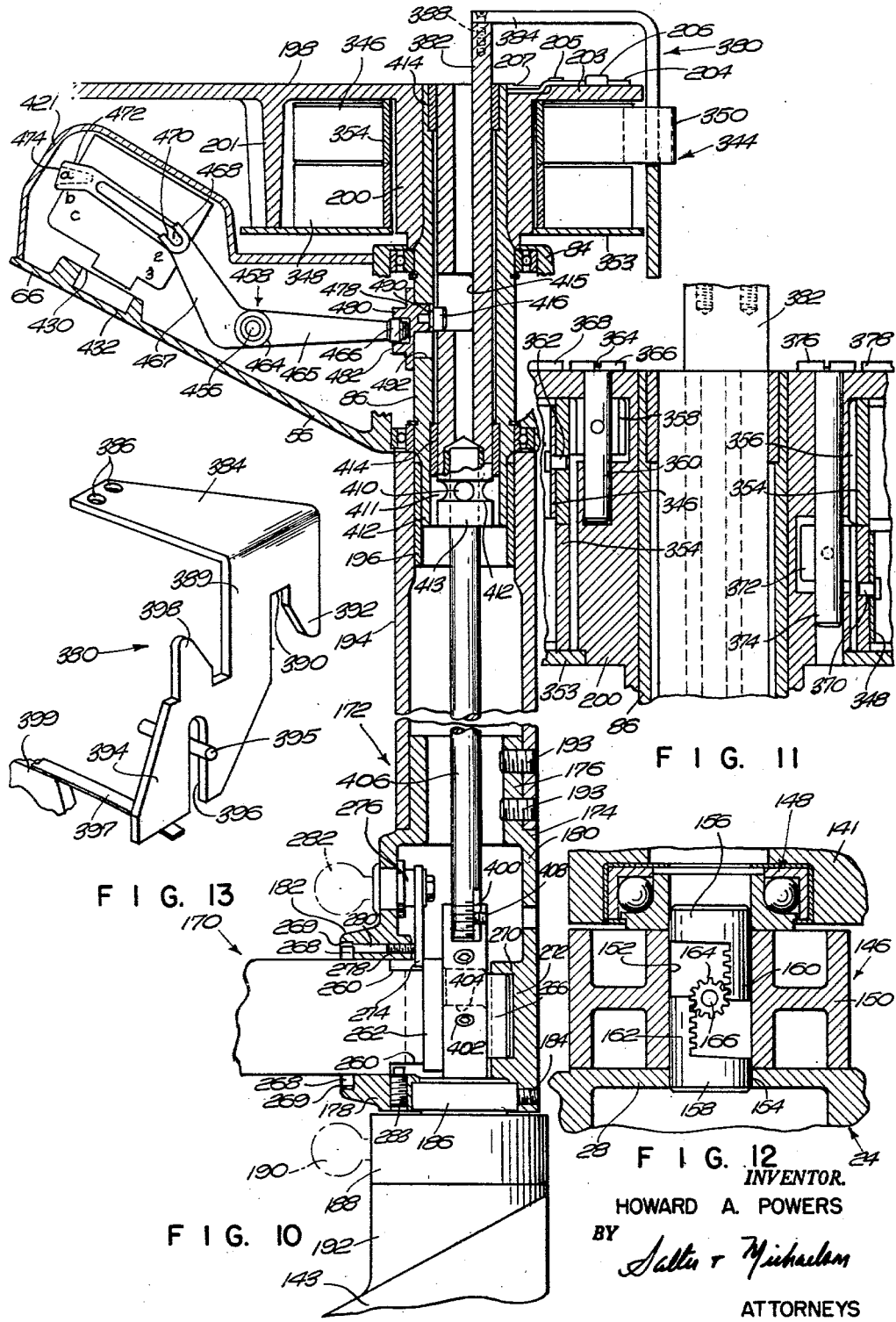

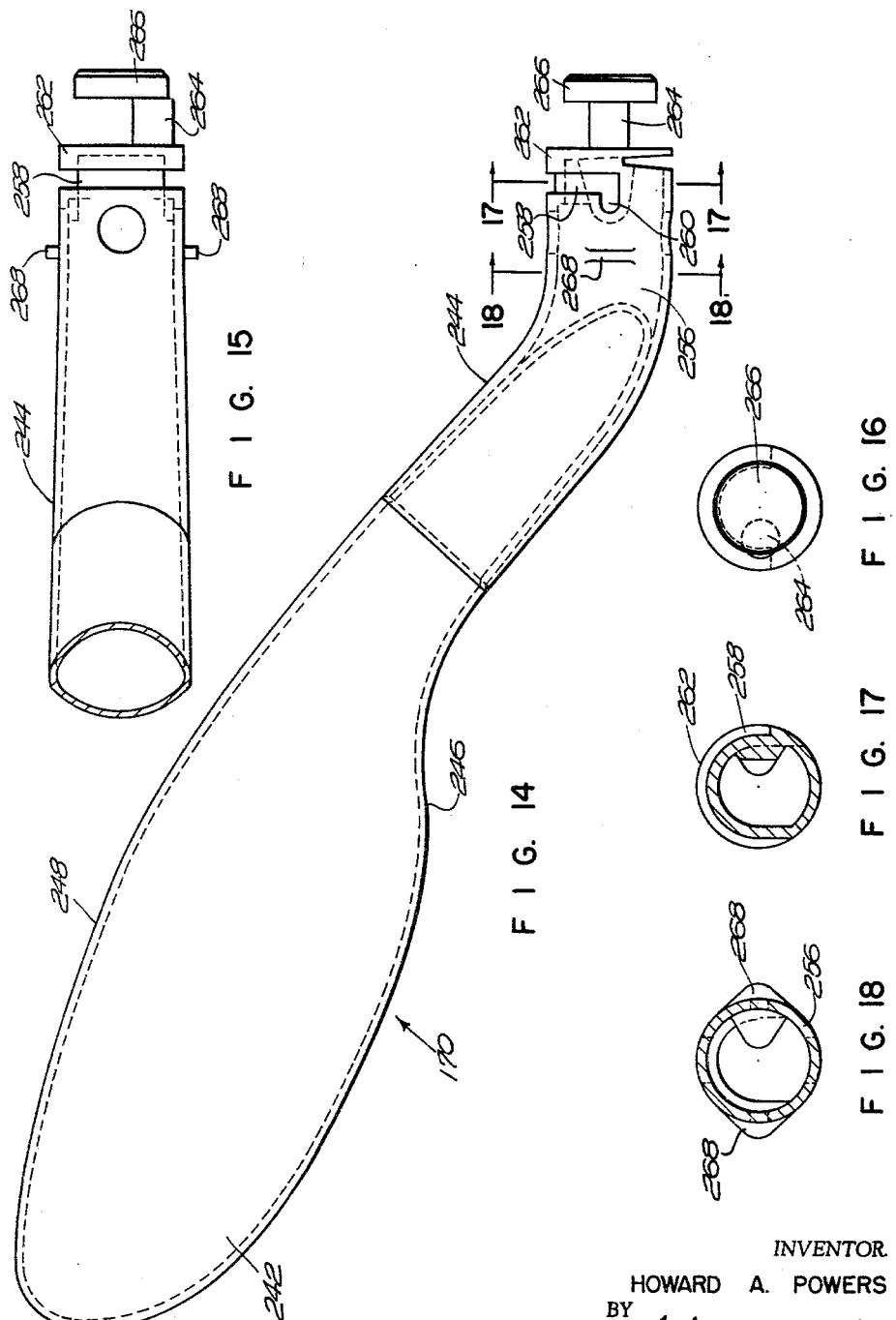

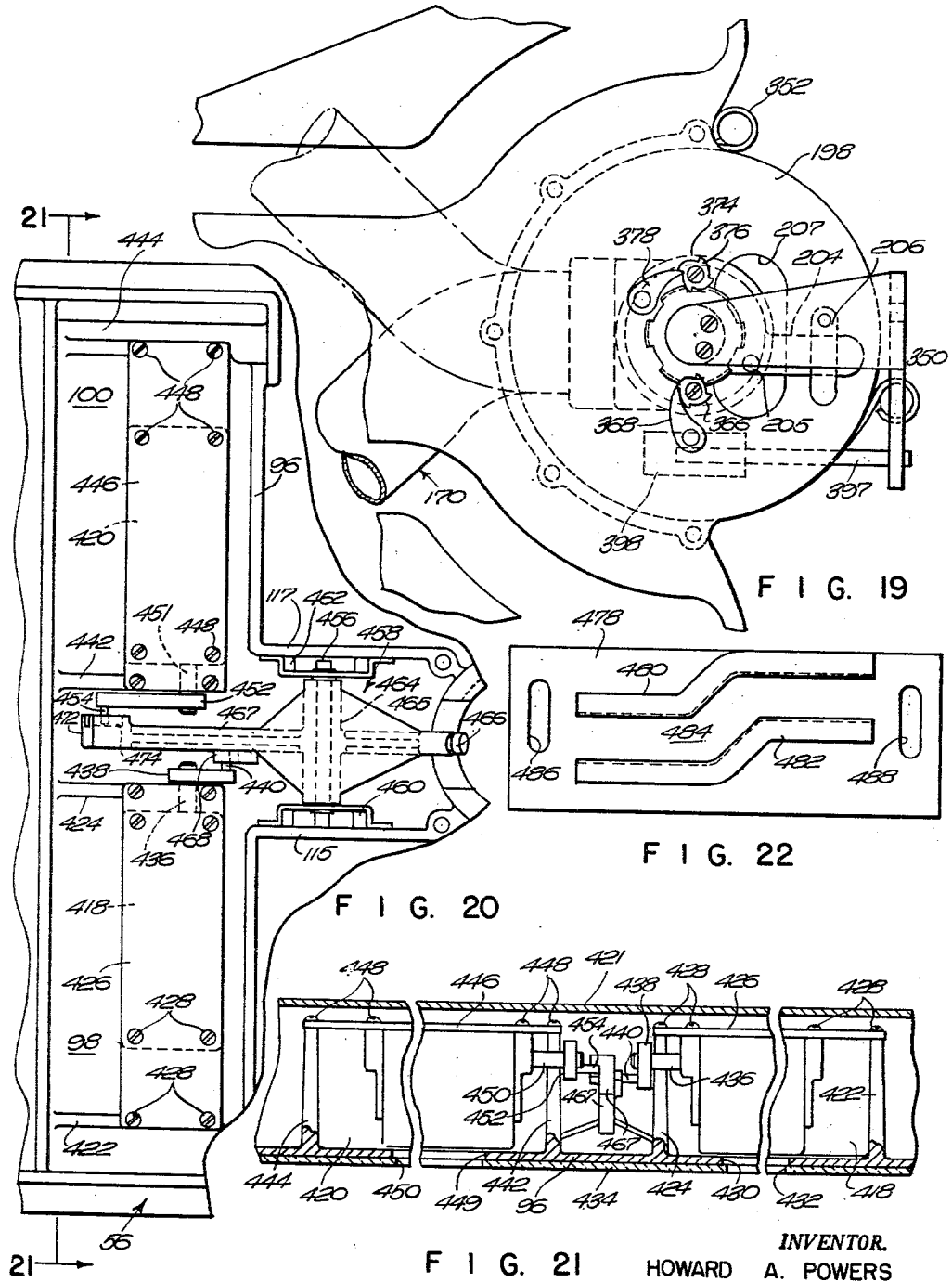

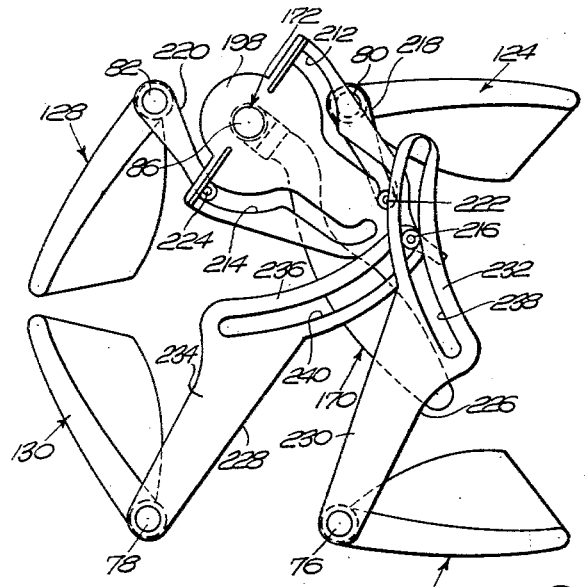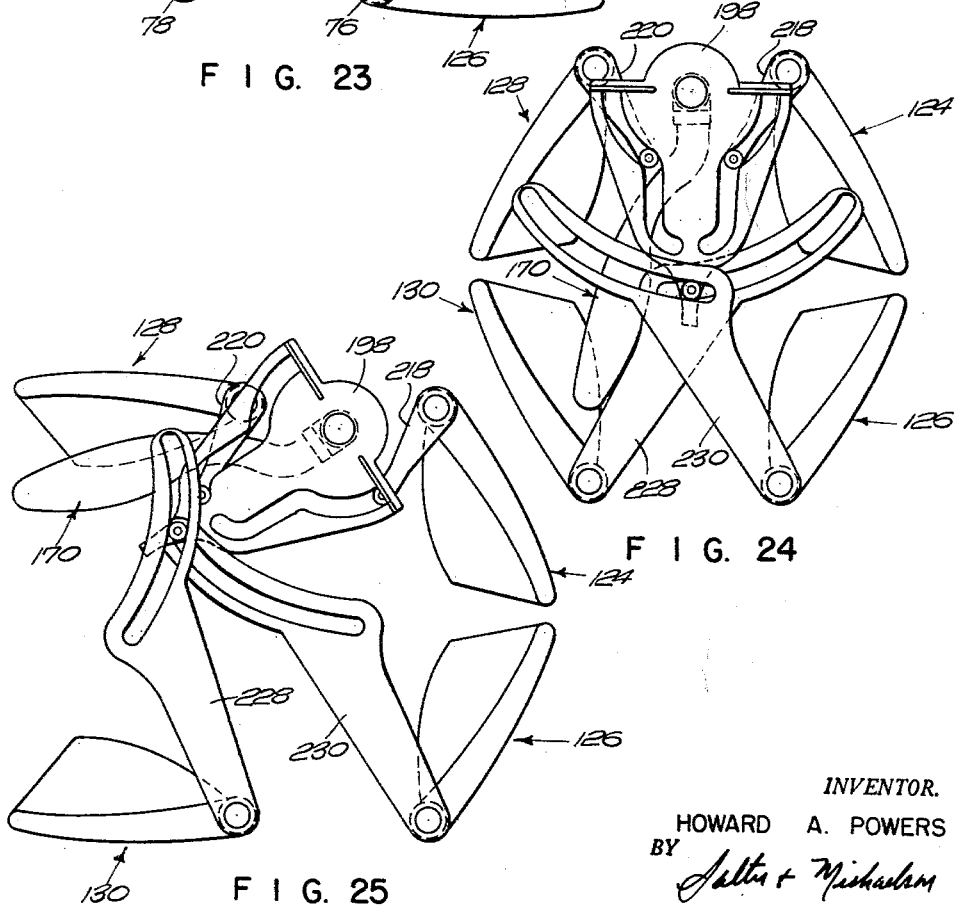

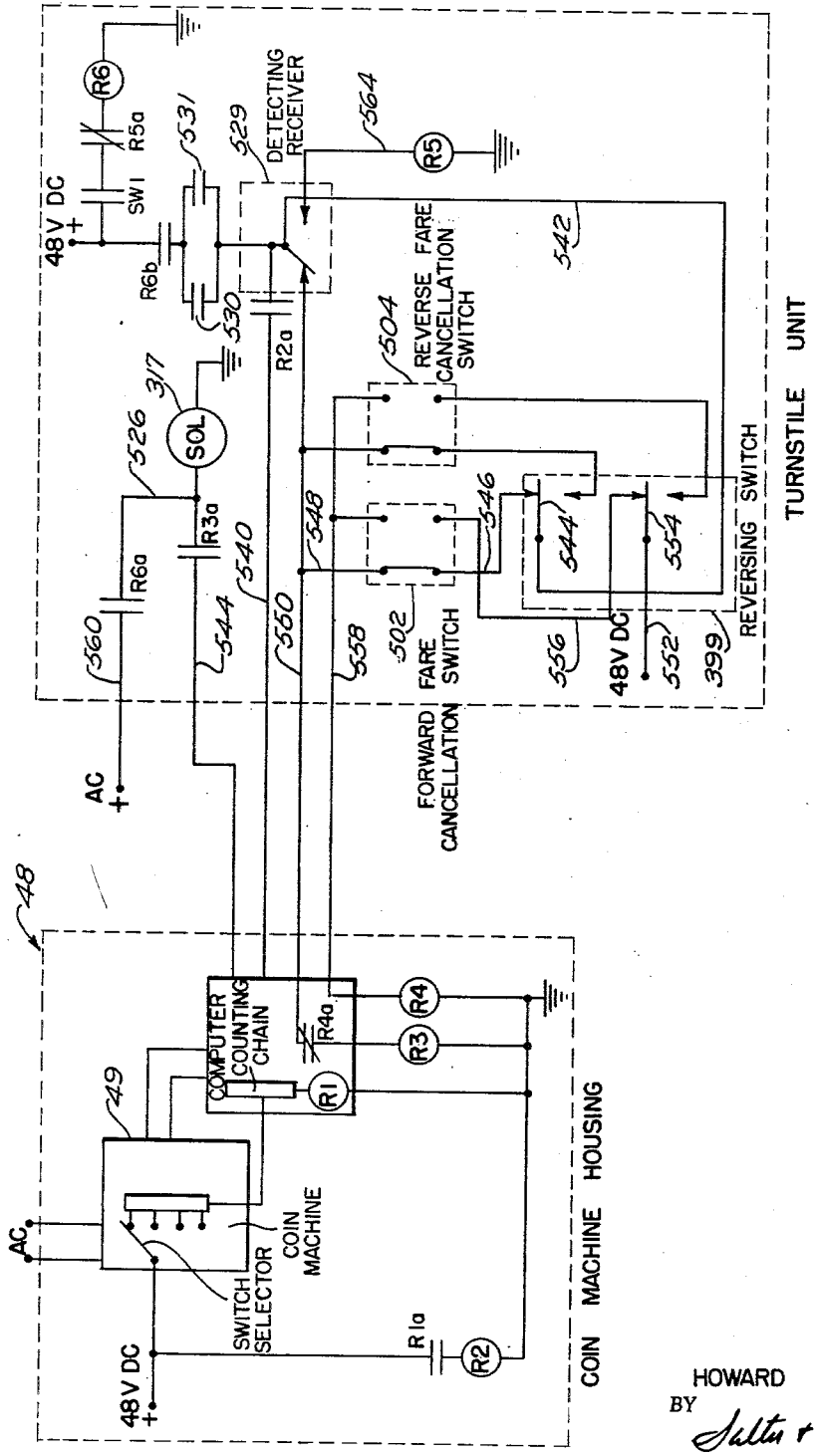

United States Patent Office 3,169,329
Patented Feb. 16, 1965

3,169,329
TURNSTILE
Howard A. Powers, Medfield, Mass., assignor to Universal Controls, Inc., New York, N.Y., a corporation of Maryland
Filed May 31, 1962, Ser. No. 199,030
43 Claims. (Cl. 39—3)

The present invention relates to a turnstile. More particularly, the present invention relates to a turnstile assembly that is utilized in conjunction with a coin machine for automatically controlling patron access through a gate or station, the turnstile assembly being so arranged as to eliminate the requirement of direct supervision thereof.

The turnstile assembly embodied in the present invention has particular application in rapid transit systems, such as subways, where multiple turnstile stations are located. However, it will be apparent that the concept of the invention may be utilized for controlling access through gates or stations such as would be found at theaters, sports arenas, amusement parks, museums, airport observation decks and other locations wherein a fixed fee is usually charged for admission.

In rapid transit systems, such as subways, the turnstiles now in use, which generally are the standard rotary arm type, are normally positioned at several locations in a single station, thereby making it possible for a patron to enter the station from several different street corners. Usually, a cashier booth is located near the middle of the station and is provided for those patrons who require change or tokens. The cashier located in the cashier's booth also attends or supervises one or more rows of the entrance turnstiles. However, in rush hours, the cashier is normally too busy to adequately supervise admission through the turnstiles and consequently, it has been found that the turnstiles now in use can be avoided by either climbing over or ducking under the turnstile arm.

In some instances, a high level cage type rotary turnstile has been installed at locations remote from the cashier's booth and included a coin machine that was adapted to take only a specific coin or token. This type of turnstile was thereby operable to some degree without supervision. In the prior known high level turnstile, it was not possible to climb over, under or gain access through the turnstile in the manner that was generally experienced with the standard rotary arm turnstile. However, this type of equipment was not only unattractive in appearance but had a tendency to trap a patron inside. Moreover, the high level turnstile was difficult to operate, particularly when the patron carried packages or suitcases in to the turnstile.

In the prior known turnstile constructions, the operating mechanism therefor was usually buried in the floor, although in some instances it was mounted on the floor where it was subjected to flooding and contamination. It is understandable that installation and maintenance of the imbedded type of construction was difficult to carry out because the floor had to be torn up to gain access to the operating mechanism. The coin machines associated with the prior known turnstiles were generally of that type that were adapted to receive only a single coin or token therein. This necessitated the patron's obtaining change or buying tokens at the cashier's booth, and during rush hours, long delays were normally experienced by those patrons requiring change or tokens. The use of some of the prior known turnstiles was further found to be objectionable since they were normally operable in only one direction. This necessitated the use of exit gates which merely acted to increase the area that had to be supervised.

The need for adequate unsupervised turnstiles in theaters, museums, amusement parks, sport arenas, and other similar locations, has been frequently expressed, since the supervised turnstile or admission station requires additional personnel who materially add to the cost of operating the theater, park or arena. The present invention is designed to eliminate the above objectionable features of the prior known turnstiles or pay stations and provides a unique form of unsupervised turnstile that includes a coin machine that is adapted to receive a variety of tokens and various combinations of coins. The turnstile embodied herein further includes a unique arrangement of twin doors that define an enclosure, the doors being constructed and arranged to permit entry of only one patron at a time within the enclosure, wherein supervision of entry through the turnstile is thereby unnecessary. Although the turnstile will permit only one person at a time to move therethrough on the deposit of a single fare, there is sufficient room within the turnstile enclosure to carry packages or other items that may be in the possession of a patron.

The turnstile unit embodied herein is unique in that it occupies a minimum of floor space since all of the operating mechanism is located in a canopy above the unit. Since the operating mechanism for the turnstile unit is positioned in the elevated canopy, flooding and contamination thereof is prevented, and furthermore, maintenance of the equipment is facilitated since it is not necessary to tear up the floor, as was known heretofore. The turnstile of the present invention is tamper proof and vandal proof since all of the operating parts are locked within the upper canopy. The accessible portions are reasonably rugged in construction and are resistant to normal tampering. By using modern materials, such as plastic, and locating the operating mechanism in the upper canopy, the turnstile is easily maintained and kept clean. In connection with maintenance, the doors associated with the turnstile are easily replaced, and modular construction permits adding or removing door units without difficulty. The canopy construction also lends itself to receiving illuminated signs for directing patrons in the proper direction. In this connection, the turnstile unit is provided with a novel reversing mechanism that enables the doors to be operated in reverse so that the exit and entrance to the turnstile can be arranged in accordance with the amount of traffic being handled.

The operating mechanism of the turnstile unit is responsive to movement of the patron against the operating arm thereof. However the operating mechanism will operate only if a proper fare has been deposited in the coin machine that is electrically connected to the turnstile unit. Since the coin machine is adapted to receive a variety of coins and tokens, exact change is not necessary, thereby avoiding in many instances the need of obtaining change at the cashier's window. A unique locking structure is incorporated in the operating mechanism that is adapted to prevent operation of the turnstile doors unless the proper fare is deposited in the coin machine. This locking structure includes a locking bar that is operatively connected to a solenoid that is, in turn, responsive to the deposit of a fare in the coin machine, the locking bar being adapted to release the operating doors for movement when a patron deposits the proper fare in the coin machine and then engages the operating arm of the turnstile unit. The turnstile embodied in the present invention also incorporates a detecting device, when the unit is used as an exit, that is adapted to determine when a person is located within the turnstile enclosure after a patron has exited therethrough. The detecting device thus causes the locking bar to lock the entrance doors in the closed position thereof and prevents a would-be trespasser from slipping through the turnstile from the exit side after a patron has made his exit through the unit.

The turnstile doors are driven by a unique drive arm and lever assembly that is responsive to the movement of the operating arm. The drive arm and lever assembly is so constructed and arranged as to provide for the opening of the exit doors as the entrance doors close so as to insure the passage of only one patron at a time through the unit. A spring return device automatically returns the doors to the normal position thereof when the patron has moved past the exit doors of the unit. The present invention further includes a novel counter mechanism that is responsive to reverse or forward movement of the operating mechanism for counting the number of patrons passing through the turnstile.

It is therefore an object of the present invention to provide a turnstile for use at a fare collection station that may be unatttended and that permits rapid transfer of patrons therethrough.

Another object of the invention is to provide a turnstile unit that is relatively unsupervised and that will permit only one patron at a time to pass therethrough.

Still another object is to provide a reversible turnstile for use at a fare collection station that is used in conjunction with a coin machine, the turnstile being operable only in response to the deposit of a fare paid into the coin machine.

Another object is to provide a modern appearing turnstile construction that is safe in the use thereof and that is easy to operate by the patron passing therethrough.

Another object is to provide a turnstile that is used in conjunction with a coin machine, the coin machine being adapted to accept tokens and various denominations of coins.

Still another object is to provide a door assembly for a turnstile which includes spaced sets of doors that define an enclosure, a first set of the door being normally open and movable to a closed position upon entry of a patron into the enclosure and a second set of doors being normally closed and movable to an open position upon entry of the patron into the enclosure.

Still another object is to provide a turnstile that occupies a minimum of floor space, the operating mechanism thereof being located in a canopy above the turnstile doors.

Still another object is to provide a universal type of turnstile machine that readily receives all sizes and shapes of patrons passing through the enclosure thereof.

Still another object is to provide a vandal-proof and tamper-proof turnstile construction that is easily maintained and kept clean.

Still another object is to provide a turnstile construction that is reversible in operation in accordance with the flow of traffic therethrough.

Still another object is to provide a turnstile unit that includes a unique door construction that is operated by an operating arm responsive to the movement of a patron passing through the unit.

Still another object is to provide an operating mechanism that is located in the canopy above the turnstile unit and that includes a drive arm and lever construction that provides for easy movement of the operating arm so as to reduce the effort required to open and close the turnstile doors.

Still another object is to provide a detecting device for use in the turnstile unit that detects whether a patron is located with the enclosure thereof.

Other objects, features and advantages of the invention will become apparent as the description thereof proceeds when considered in connection with the accompanying illustrative drawings.

In the drawings which illustrate the best mode presently contemplated for carrying out the present invention:

FIG. 1 is a perspective view of a bank of turnstiles of the type embodied herein showing entrance and exit installations at a subway station or the like;

FIG. 4 is an enlarged side elevational view of the canopy section with the side of the canopy cover removed;

FIG. 5 is a sectional view taken along lines 5—5 in FIG. 4 showing the interrelation of the canopy cover and the canopy lamp diffuser;

FIG. 5a is a sectional view taken along lines 5a—5a in FIG. 9;

FIG. 6 is a top plan view of the turnstile operating mechanism showing the relative positions of the operating levers, drive arm and locking bar with respect to the main frame;

FIG. 7 is a plan view of a pawl and actuating roller that operate a cancellation switch;

FIG. 8 is a sectional view taken along lines 8—8 in FIG. 7;

FIG. 9 is a top plan view of the operating mechanism showing the position thereof when both sets of doors are in the closed position and further showing the locks for the canopy assembly diffusion panel;

FIG. 10 is a vertical sectional view, with parts shown in elevation, of the turnstile drive shaft, drive arm and a portion of the main frame, the mechanism for reversing the operation of the turnstile being illustrated together with the interrelation of the turnstile counters to the reversing mechanism;

FIG. 11 is an enlarged sectional view of the turnstile return springs and the tension device therefore illustrated in FIG. 10;

FIG. 12 is a sectional view taken along lines 12—12 in FIG. 2;

FIG. 13 is an enlarged perspective view of the reversing bracket that cooperates with the return springs to provide for reversal of operation of the turnstile;

FIG. 14 is a top plan view of the operating arm assembly showing the details of the operating arm crank shaft;

FIG. 15 is a side elevational view of the operating arm crank shaft;

FIG. 16 is an end view of the operating arm crank shaft;

FIG. 17 is a sectional view taken along lines 17—17 in FIG. 14;

FIG. 18 is a sectional view taken along lines 18—18 in FIG. 14;

FIG. 19 is a top plan view of the drive arm and reversing bracket shown in FIG. 10;

FIG. 20 is a top plan view of the turnstile counters as they are mounted on the main frame wherein the interconnection thereof to the drive arms as shown in FIG. 10 is illustrated;

FIG. 21 is a sectional view taken along line 21—21 in FIG. 20;

FIG. 22 is a development of the cam that is mounted on the drive shaft and that is utilized to control the operation of the counters;

FIGS. 23, 24 and 25 are top plan views of the linkage control mechanism that operates the turnstile doors, the sequential positions of the control mechanism and the doors being illustrated as a patron passes through the turnstile; and FIG. 26 is a diagrammatic illustration of the electrical circuit for the turnstile unit showing the interrelation of the electrical components of the turnstile and the coin machine and computer utilized therewith.

The turnstile unit embodied in the present invention has application in a variety of installations and may be installed in any place where a relatively fixed fare or fee is charged for admission. Although the turnstile unit is designed for use particularly in rapid transit systems such as subways and the like, other areas where the unit may be usefully installed are: theaters, sports arenas, amusement parks, museums, airport observation decks, etc.

Figure 1:
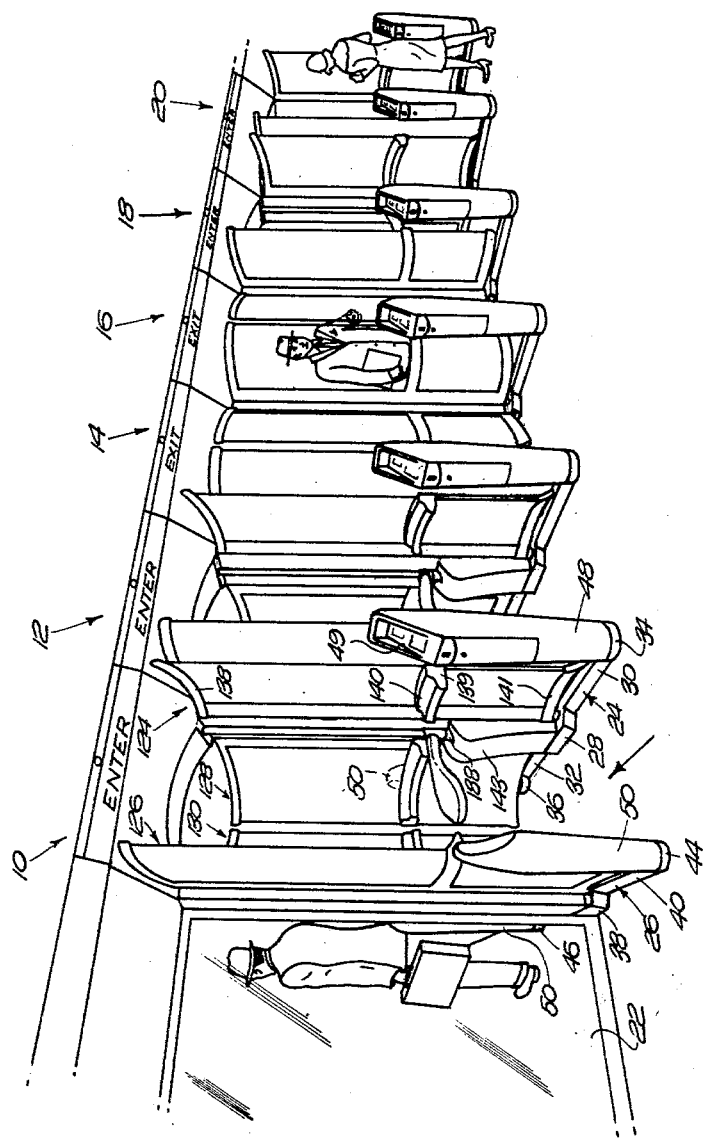

Referring now to the drawings and particularly to FIG. 1, a bank of turnstile units are shown installed at a subway station for controlling passenger flow to and from the train loading areas. For purposes of illustration the turnstile units are generally indicated at 10, 12, 14, 16, 18 and 20. As will be described hereinafter, all of the turnstile units are reversible in operation and as illustrated in FIG. 1, the centermost units 14 and 16 are designated as exits while the other units 10, 12, 18 and 20 are designated as entrances. It is understood, however, that the entrance and exit turnstile units are identical in construction and in operation. As illustrated in FIG. 1, the turnstile units are arranged in a bank in side-by-side relation and although six units are shown, additional units may be added to the bank, or one or more may be removed depending on the demands created by passenger traffic. The turnstile units may extend from wall to wall at the subway station but as shown in FIG. 1, a glass partition 22, that extends from one wall of the station, abuts the extreme left turnstile unit 10. A semilar glass partition or the like may be erected on the other side of the turnstile bank if the space requirements so demand. The glass partitions 22 cooperate with the turnstile units to not only define a restricted access area but further define a barrier construction that is modern in concept and feeling.

I. Base and support structure

Since all of the turnstile units are identical in construction only one of the units will be described with respect to the details and operation thereof. Referring again to FIG. 1 and also to FIGS. 2 and 3, the turnstile unit 10 is illustrated in detail and as shown includes parallel base members generally indicated at 24 and 26 that are spaced apart to define the passenger access area or enclosure.

The base member 24 is elongated in form and includes an enlarged central portion 28 to which are joined oppositely extending web sections 30 and 32. Both web sections 30, 32 have tapered or inclined side wall formations as seen in FIG. 1, which tend to prevent the accumulation of dirt and other debris thereon. Joined to the outer end of the web sections 30, 32 are pedestals 34 and 36 respectively which are substantially circular in configuration. Both the enlarged central portion 28 and the pedestals 34, 36 are fastened directly to the floor of the subway station by bolts that extend through openings suitably formed therein. The base member 26 is formed identically as the base member 24 and includes a central portion 38 to which are joined web sections 40, 42 having inclined side walls. Circular shaped pedestals 44 and 46 are joined to the web sections 40, 42 respectively and are bolted to the floor of the subway station together with the central portion 38. Although only two of the base members for a turnstile unit have been described, it will be noted in FIG. 1 that each unit includes two base members and that except for the extreme end base member, each base member is located intermediate of two of the turnstile units. Thus, for example, base member 24 is utilized with both turnstile units 10 and 12 and defines an intermediate support upon which the component parts of the units are mounted.

Since the turnstile units are coin controlled for controlling passenger access therethrough a coin machine is adapted to be located at the forward or entrance area of each unit and as is the conventional practice, the coin machine is positioned to the right of each turnstile unit just prior to entry into the unit. As seen in FIG. 1, a coin machine housing 48 is secured to the pedestal 34 of the base member 24 and has a coin machine 49 mounted therein for receiving fares from passengers entering the turnstile unit 10. As will be described hereinafter the coin machine 49 located in the housing 48 is electrically interconnected to the operating mechanism of the turnstile unit 10 and upon deposit of the proper fare therein will unlock the operating mechanism to permit passage through the unit. The coin machine 49 is adapted to receive tokens and various denominations of coins and is generally of that type illustrated and described in copending application Ser. No. 55,256 filed September 12, 1960.

As illustrated in FIG. 1, the coin machine housing 48 has a generally tapered cylindrical construction, the upper end thereof receiving the coin machine 49 which has a slot formed therein into which the patron's fare is adapted to be deposited. The lower end of the housing 48 conforms generally to the configuration of the pedestal 34 to lend a finished and modern appearance to the assembly. In order to aesthetically balance the appearance of the entranceway to the turnstile unit 10, a generally tapered cylindrical dummy pylon 50 is provided and is mounted on the pedestal 44 of the base member 26. The end sections 36 and 46 of the base members 24 and 26 respectively also have dummy pylons 50 mounted thereon which balance the appearance of the exit side of the turnstile unit 10. When the turnstile 10 is reversed in operation and is utilized as an exit, the coin machine housing 48 may be rotated to turn the coin slot away from the fare receiving position or if desired, the coin machine housing 48 may be removed and replaced by a dummy pylon. Similarly, the coin machine housings shown at exit units 16 and 18 may be rotated or replaced by dummy pylons. When these units are put in operation as entrance units then the coin machine housing associated therewith will be located in proper position so that the coin machines mounted therein will receive fares in their coin slots.

Although various placements of the coin machine housings 48 are contemplated, as described above, in the usual operation of the turnstile units, the housings 48 are placed on the entrance side of the station as shown in FIG. 1 and normally will not be changed in position. Since the exit sides of the turnstile units do not require a coin machine only the dummy pylons 50 are placed there. However, if the turnstile unit were located at a station where fares were to be received from patrons entering from both sides of the unit such as in a zone fare system, then the coin machine housings 48 would replace the dummy pylons 50 as required.

Mounted on the enlarged central portions 28 and 38 of the base members 24 and 26 and bolted thereto are support columns 52 and 54 respectively which extend upwardly from the base members to a main frame located in a canopy to be described. The support columns 52 and 54 are preferably formed of extruded aluminum and are each constructed in identical halves that are secured together by dovetail grooves to define the columnar construction.

Figure 2:
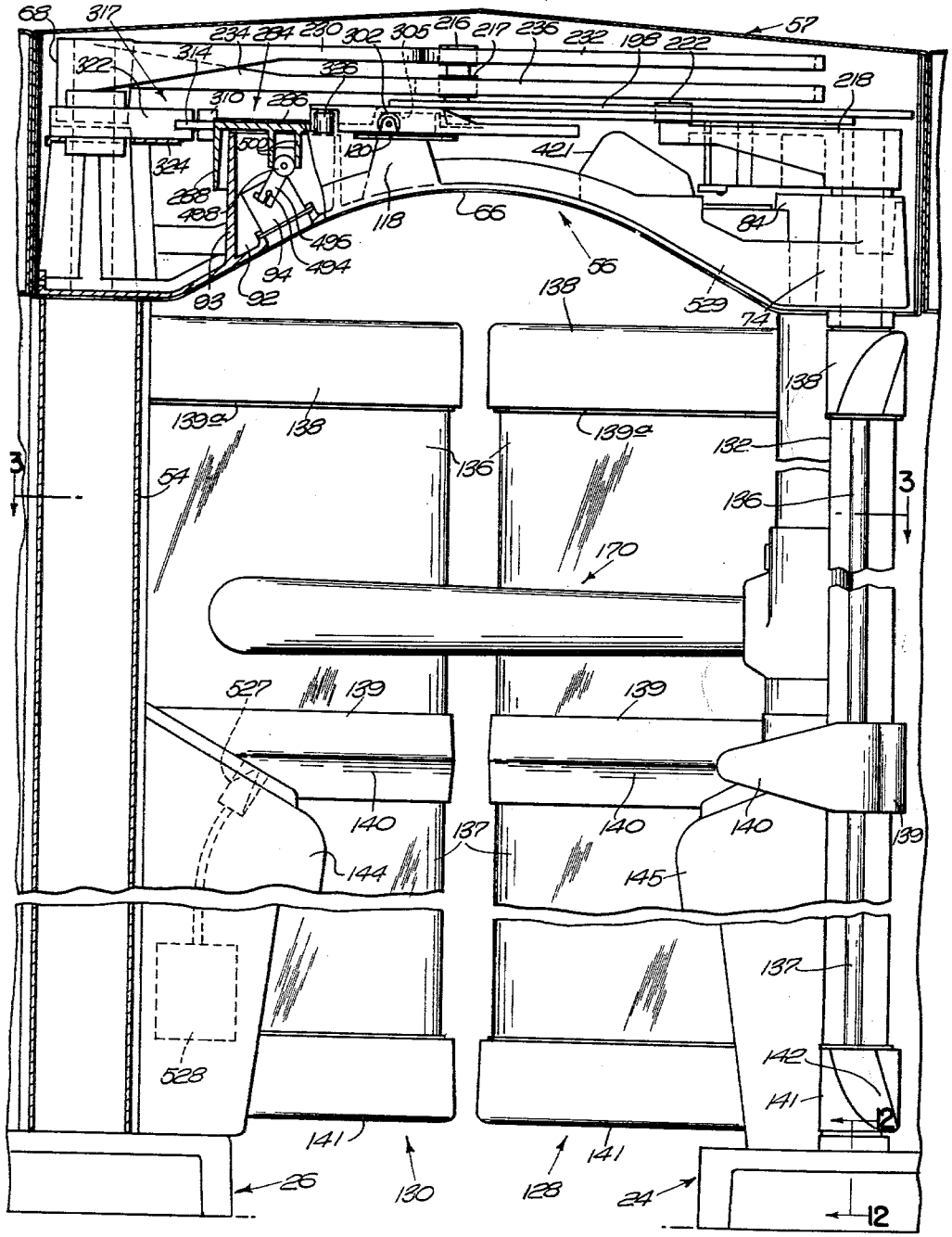
FIG. 2 is a front elevational view, with parts shown in section, of one of the entrance turnstile units.

Mounted on the uppermost ends of the support columns 52, 54 and secured thereto by suitable bolts or screws is a main frame generally indicated at 56. The main frame 56 is located in a canopy assembly generally indicated at 57, which as will be described hereinafter houses the operating mechanism of the turnstile. As shown in FIGS. 2 and 6, the main frame 56 is formed in a spider-like construction and has a generally rectangular configuration. The spider-like construction of the main frame 56 includes marginal front and rear edges 58, 60 and marginal side edges 62, 64. The central portion of the main frame 56 is arched as indicated at 66 in FIG. 2, so as to provide sufficient head room for the patrons passing thereunder. Formed on the corners of the main frame 56 are hollow upstanding hubs 68, 70, 72, and 74, the hubs 68, 70 being somewhat greater in height than the hubs 72 and 74 so as to provide for the overlapping of the door levers as will be described hereinafter. The hubs 68, 70, 72 and 74 are all adapted to receive splined shafts therein and are thus provided with suitable bearings, as will be seen, for rotatably mounting the splined shafts therein.

Formed on the right hand side of the main frame 56 as seen in FIG. 2 and intermediate the hollow hubs 72, 74 is a hollow central hub 84 through which an upper shaft portion 86 of a drive shaft assembly to be described extends. As seen in FIG. 2, a chamber 92 defined by a cast tube 93 is formed on the arched portion of the main frame 56 and has a transaction counter 94, to be described, mounted therein. Formed on the arched portion 66 of the main frame 56 opposite the cast tube 93 is a transversely extending web 96 (FIG. 6) in which cavities 98 and 100 are formed for receiving counting mechanisms to be described. Additional cavities 106, 108 are also formed in the web 96 adjacent the cavities 98 and 100 and are adapted to receive cancellation switches, the purpose of which will also be described hereinafter. As shown in FIG. 6, a rear portion of the web 96 includes opposed walls 115, 117 which are integrally joined to the hub 84 and cooperate therewith to add rigidity to the main frame 56. Formed on the front and rear marginal edges 58, 60 adjacent the midpoint of the arched portion 66, are upstanding lugs 116, 118 respectively (FIGS. 6 and 9) on which are secured rollers 120, 122 respectively, that are adapted to slidably mount a locking bar, the purpose of which will be described hereinafter.

II. Door assembly

The turnstile embodied herein is designed to provide limited access to the interior thereof so as to permit only a single person to pass therethrough. In order to carry out this objective a plurality of doors are provided that extend from the main frame 56 to the base members 24 and 26. As shown in FIG. 1, doors generally indicated at 124 and 126 are located on the entrance side of the turnstile unit 10 while doors generally indicated at 128 and 130 are located on the exit side thereof. It is understood, of course, that operation of the doors may be reversed, depending on the direction of patron traffic, that is, the doors 124, 126 may be employed as exit doors, in which case, the doors 128, 130 would be utilized as entrance doors. All of the doors are constructed substantially similar, the only difference being the arrangement of parts to provide for the direction of pivotal movement. With reference to door 124 as exemplary of the construction of the turnstile doors, it is seen in FIGS. 1, 2 and 6, in particular, that a pivot stile 132 is provided and extends substantially the length of the door. Formed in the outwardly facing edge of the pivot stile 132 and extending substantially the length thereof is a channel 134 that receives both an edge of a curved, laminated safety glass panel 136 and a curved skirt panel 137 located below the panel 136 as will be described. As seen in FIGS. 1 and 2, the curved configuration of the door 124 cooperates with the corresponding curved configuration of the door 126 to provide a sufficient space within the enclosure of the turnstile unit for the patron passing therethrough when the doors are disposed in the closed position thereof.

Secured around the pivot stile 132 at the upper end thereof in enveloping relation is a top rail 138 that is formed with a splined pivot hole 135 (FIG. 4) for receiving the door shaft 76 therein.

Suitable bearings (not shown) are mounted in spaced relation in the upstanding hub 72 and receive the splined shaft 80 therein. Since the top rail 138 is secured to the shaft 80 through the splined opening 135, the door 124 is pivotally mounted in position with respect to the main frame 56.

Secured to the pivot stile 132 intermediate the ends thereof is a spacer member 139 (FIG. 2) that includes an outwardly projecting tapered portion 140 that extends into the space occupied by the patron when the doors are closed and thereby reduces the available patron space.

The top rail 138 and the spacer member 139 have a curved configuration corresponding to that of the curved glass panel 136 and are formed with horizontally directed slots that are adapted to receive the glass panel 136 therein. The top edge of the glass panel 136 is thus secured within the slot in the undersurface of said top rail 138 while the bottom edge of the glass panel is secured within the slot in the upper surface of the spacer member 139. In order to fix the glass panel in the slots in the top rail, pivot stile 132 and spacer member 138, rubber gaskets 139a (FIG. 4) are provided and define the margins for the glass panel 136.

Secured around the pivot stile 132 at the lower end thereof in enveloping relation is a bottom rail 141 in which a slot is formed for receiving the lower edge of the curved skirt panel 137. The uppermost edge of the metallic skirt panel 137 is received within a slot formed in the underside of the spacer member 139, the pivot stile 132, the spacer member 139, and bottom rail 141, thus cooperating to effectively support the curved skirt panel in position. Rubber gaskets 139a are also provided on the margins of the skirt panel for locking it in the bottom rail, spacer member and pivot stile. As seen in FIGS. 1 and 2, the outermost end of the bottom rail 141 is toed out as indicated at 142. This configuration tends to prevent the patron from snagging or bumping his heels on the bottom rail as the doors 124, 126 close and further acts to prevent low carried objects from interfering with the bottom rail as the patron passes through the turnstile enclosure. The outermost end of the top rail 138 is also formed with a toe out so as to provide a symmetrical appearance for the doors.

As described above, the spacer member 139 includes a tapered projecting portion 140 that extends into the turnstile enclosure for reducing the enclosure space.

Figure 3:
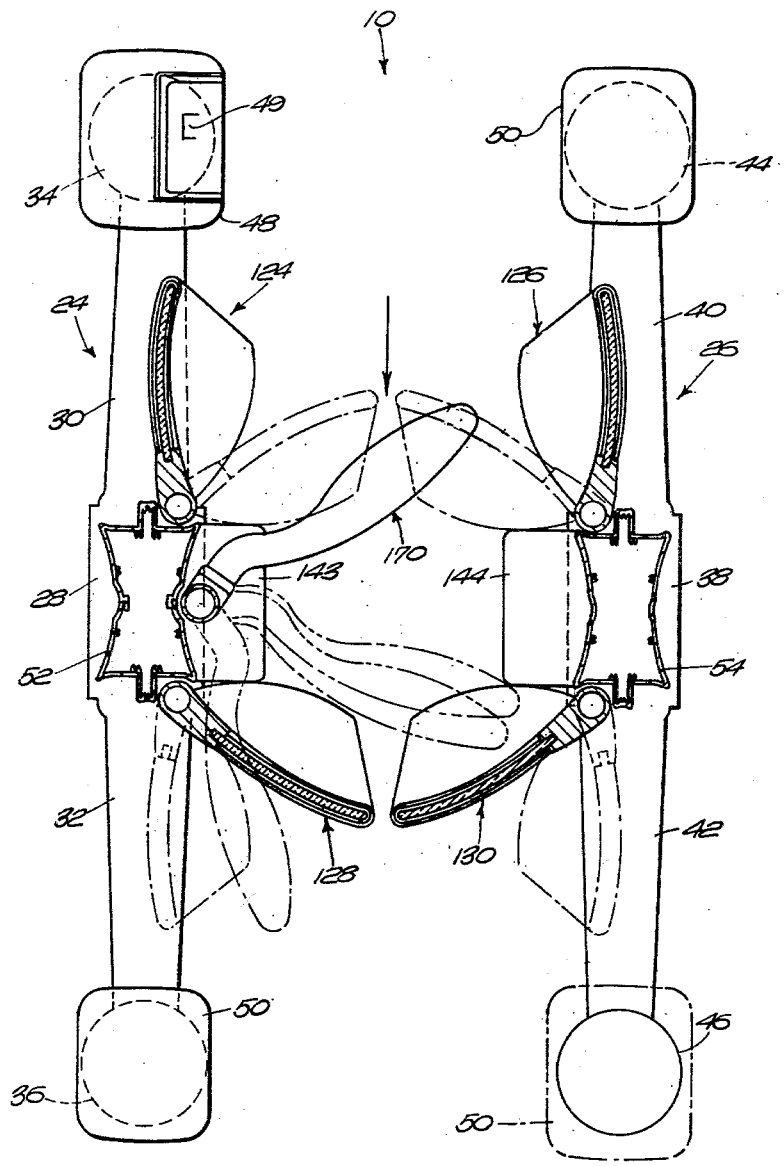
FIG. 3 is a horizontal sectional view taken along lines 3—3 in FIG. 2.

As shown in FIG. 2, in particular, additional space reducing members illustrated as a pivot panel 143 and a space reducing panel 144 are provided and are secured to the support columns 52, 54 respectively (FIG. 3) in opposed relation and project into the enclosre that defines the interior of the turnstile unit. As illustrated in FIGS. 1 and 3, the pivot panel 143 and the space reducing panel 144, have a vertically inclined configuration wherein the maximum point of projection occurs at approximately the same level as the projecting portions 140 of the spacer members 139. This effectively reduces the enclosure space so that only one person at a time can enter the turnstile enclosure.

As described above in connection with FIG. 4, the upper ends of the turnstile doors are pivotally mounted on the main frame 56 through splined shafts 76, 78, 80 and 82 that project through the main frame hubs 68, 70, 72 and 74 respectively. As will be described below the splined door shafts are interconnected to an upper operating assembly mechanism that is responsive to the movement of a patron passing through the turnstile, the shafts thereby being rotated to pivotally move the doors. In order to pivotally mount the lower ends of the doors in the base members 24, 26, pivot lock assemblies are provided, the pivot lock assemblies further enabling the doors to be removed from the turnstile assembly as desired. Referring now to FIG. 12, one of the pivot lock assemblies is illustrated and as shown comprises a door spacer generally indicated at 146. The door spacer 146 is interposed between a bearing 148 that is fixed in the bottom rail 141 coaxial with the pivot axis thereof, and includes a spacer block 150 in which an axial opening 152 is formed. The axial opening 152 is aligned with a suitable hole 154 that is formed in the central portion 28 of the base member 24. The opening 152 is also coaxial with the inner race of the bearing 148 and slidably receives therein opposed plungers 156 and 158 of a lock mechanism.

Formed integral with the plungers 156, 158 are rack extensions 160, 162 respectively on which teeth are formed that mesh with a pinion 164. The pinion 164 is secured to a shaft 166 that is formed as part of the lock mechanism and that is adapted to be rotated when a key is inserted into the lock mechanism and turned. When the key is turned to the locked position, the plungers 156, 158 are moved outwardly, the plunger 158 projecting into the hole 154 and the plunger 156 projecting into the inner race of the bearing 148. The door 124 is then pivotally locked in position between the base member 24 and the hub 72 on the main frame 56 into which the shaft 80 extends.

The doors 124 and 126 are normally open and doors 128, 130 are normally closed when movement through the turnstile unit 10 is in the direction described in FIG. 1 and as denoted by the arrow in FIG. 6. When the patron enters the turnstile enclosure after depositing the proper fare in the coin machine 49, he engages as operating arm generally indicated at 170 which as shown in FIG. 2 extends substantially the width of the turnstile enclosure and is in the path of the patron. As will be described in connection with the operation of the turnstile, movement of the patron against the operating arm 170 forces the operating arm to pivot out of the path of the patron, the pivoting movement of the operating arm resulting in closing of the doors 124, 126 and opening of the doors 128, 130. The patron then exits from the turnstile unit through the now open doors 128, 130 which are thereafter automatically returned to their normally closed positon. As will be described, the doors 124, 126 are simultaneously returned to their normally open position and the turnstile is ready to receive the next patron.

III. Drive shaft and operating mechanism

In order to provide for pivotal movement of the operating arm 170 and the corresponding movement of the turnstile doors, a drive shaft generally indicated at 172 in FIG. 10 is employed. The drive shaft 172 includes a lower hub portion 174 that is hollow in construction and that has an upwardly extending reduced neck 176, a lower neck 178 and a central portion 180. The central portion 180 is formed with an outwardly extending annular flange 182 in which an opening is formed for receiving a crank shaft of the operating arm 170, the purpose of which will be described hereinafter. Secured in the opening that is formed in the lower neck 178 by a set screw 184 is a ball bearing assembly 186 which is similar to the bearing 148 mounted on the underside of the doors (see FIG. 12). The drive shaft 172 is rotatably mounted on a spacer member 188 that is generally similar to the door spacer 146, the spacer member 188 also including opposed plungers that are axially moved by a key lock. Upon rotation of a key 190 shown in dotted lines in FIG. 10, the uppermost plunger of the spacer member 188 is moved into the inner race of the ball bearing assembly 186 and thereby pivotally locates the drive shaft 172 in position. The lowermost plunger of the spacer member 188 is simultaneously moved into a suitable opening formed in a wedge shaped pivot block 192 that is fixed to the uppermost end of the pivot panel 143. It is seen that the spacer member 188 not only rotatably mounts the drive shaft 172 in position but also provides for the disassembly thereof, as desired.

Secured to the lower hub portion 174 of the drive shaft 172 by set screws 193 is an intermediate sleeve portion 194 that extends upwardly to the lower end of the main frame 56. Fixed to the intermediate sleeve portion 194 through a lower spline connection 196 is the upper shaft portion 86 that extends through the central hub 84 formed on the main frame 56. The upper shaft portion 85 is hollow and the lower end thereof extends interiorly of the intermediate sleeve portion 194 and receives the upper end of a reversing rod, to be described hereinafter. As shown in FIG. 10, a casting defining a drive arm 198 is formed with an annular depending hub 200 that is splined interiorly for receiving the splined upper end of the drive shaft upper shaft portion 86. A depending flange 201 and a rearwardly extending portion 203 are formed as integral parts of the drive arm 198 and cooperate with the annular depending hub 200 for receiving a reversing spring assembly that will be described hereinafter.

As shown in FIGS. 10 and 19, the drive arm 198 is locked on the upper shaft portion 86 by a retaining member 204 that is formed with an arcuate shaped jaw that has teeth formed thereon for interlocking with the splined upper shaft portion 86. The retaining member 204 is pivotally mounted on the rearwardly extending portion 203 by a pin 205 and is thereby pivotally movable to and from the locking position. A retaining clip 206 overlies the outer end of the retaining member and locates the retaining member in the locked position. A recess 207 is formed on the surface of the rearwardly extending portion 203 and provides for locating the arcuate jaw of the retaining member 204 in engagement with the upper shaft portion 86.

Referring again to FIGS. 6 and 9, the drive arm 198 is shown having an elongated configuration and being formed with symmetrical sections 208 and 209 that taper to a reduced outer end 210. Formed in the symmetrically formed sections 208, 209 are cam slots 212, 214 respectively that have a predetermined configuration, the purpose of which will be described hereinafter. Secured to the outer end 210 of the drive arm 198 are vertically spaced rollers 216, 217, that are adapted to ride in communicating slots of a pair of camming levers as will be described. It is seen that movement of the operating arm 170 will cause the drive shaft 172 to rotate, which movement will cause a corresponding rotation of the drive arm 198.

Referring now to FIGS. 2, 3, 6 and 9, the door operating assembly mechanism is illustrated and includes relatively short opposed door transfer arms 218 and 220 that are mounted on the upper ends of the splined door shafts 80 and 82 respectively. Fixed to the outer or free ends of the transfer arms 218, 220 are rollers 222, 224, respectively, that are received within the drive arm slots 212 and 214 respectively. The slots 212 and 214 are formed with a predetermined shape that defines a modified reverse "S" configuration, such that when the drive arm 198 is rotated by the drive shaft 172, the transfer arms will be moved relative to each other. As shown in FIG. 23 the drive arm 198 is normally located in a position that is displaced from neutral wherein the outer end 210 points toward the normally open doors 124, 126. Upon initial movement of the operating arm 170 by the patron entering the turnstile enclosure, the drive shaft 172 is rotated, thereby causing the drive arm 198 to pivot in a clockwise direction to the neutral position illustrated in FIGS. 9 and 24.

Since the inner portion of the slots 212, 214 are formed with a curvature that has a center coaxial with the axis of the drive arm 198, during this initial movement of the operating arm 170, the roller 224 will ride in the slot 214 without causing any corresponding movement of the transfer arm 220 or the door 128. However, the outer portions of the slots 212, 214 have a different configuration than that of the inner portions thereof, and movement of the drive arm 198 from the position shown in FIG. 23 to the position shown in FIG. 24 causes the roller 222 to be moved to the center of the slot 212 and thereby forces the transfer arm 218 to execute a clockwise pivoting movement. Clockwise movement of the transfer arm 218 results in a corresponding rotation of the splined shaft 80 on which the door 124 is mounted. The door 124 is thus forced to pivot to the closed position thereof as illustrated in FIG. 24. In this position both doors 124 and 128 are closed and as will be described in connection with the operation of the complete turnstile unit, only a single patron may occupy the space within the enclosure. Continued forward movement of the patron through the turnstile enclosure forces the operating arm 170 to the extreme forward position permitting passage thereby. The drive shaft 172 is thus further rotated clockwise, carrying the drive arm 198 therewith. The roller 222 of the transfer arm 218 now rides in the rear portion of the slot 212 and the position of this transfer arm remains unchanged. The door 124 thus remains closed. The roller 224 has now been moved to the forward portion of the slot 214 in the drive arm 198, and the transfer arm 220 on which the roller 224 is secured is thus forced to rotate clockwise to the position illustrated in FIG. 25. The door 128 is then moved to the open position thereof.

During movement of the doors 124 and 128, the doors 126 and 130 respectively are also moved in unison therewith and in response to rotating movement of the operating arm 170 and drive shaft 172. For this purpose, an upper camming lever 226 splined to the shaft 76 and a lower camming lever 228 splined to the shaft 78 are provided. Both camming levers 226, 228 have a modified bell crank configuration, lever 226 being defined by an inner tapered portion 230 and an outer arcuate portion 232, while lever 228 includes an inner tapered portion 234 and an outer arcuate portion 236. Formed in the arcuate outer portion 232 of the lever 226 is an arcuate shaped slot 238 while a corresponding arcuate slot 240 is formed in the outer portion 236 of the lever 228, the slot 240 overlapping the slot 238. Levers 226 and 228 are adapted to effect movement of the doors 126 and 130 respectively and are interconnected to the drive arm 198 by the vertically spaced rollers 216 and 217 that project into the overlapping slots 238, 240 respectively. Referring again to FIG. 23, when the doors 124, 126 are disposed in the normally open position thereof, and the doors 128, 130 are located in the normally closed position thereof, the roller 216 is located intermediate the ends of the slot 238, but the roller 217 is located at the outer limit of the slot 240.

The arcuate slot 240 is located such that the radius of curvature thereof is coincident with the initial path of movement of the roller 217. As the drive arm 198 is rotated clockwise by the drive shaft 172 to the neutral position in FIG. 24, the roller 217 will ride in the slot 240, without causing any pivoting action of the lever 234. The door 130, during this initial movement of the drive arm 198, remains closed. Since the location of the slot 238 is substantially transverse to that of the slot 240, the initial pivoting movement of the drive arm 198 causes the lever 226 to pivot in a counterclockwise direction to the position shown in FIG. 24. The door 126 is thus moved together with the door 124 to the closed position thereof. Further movement of the drive arm 198 to the position illustrated in FIG. 25 causes the lever 228 to pivot the door 130 to the open position, while the lever 230 remains in the position shown in FIG. 24, the door 126 thereby remaining closed.

It is seen that the camming levers 226 and 228 and the transfer arms 218 and 220 are all pivoted in response to movement of the patron into contact with the operating arm 170. A corresponding movement of the doors 124, 126, 128, 130 is produced as the levers and transfer arms are pivoted thereby resulting in a sequential operation thereof, wherein doors 124, 126 are moved from the normally open to the closed position and doors 128, 130 remain closed and are then moved to the open position thereof. As will be described hereinafter, a spring return mechanism is provided for returning the doors to their normal positions when the patron releases the operating arm 170 after passing through the turnstile enclosure.

IV. Operating arm

Referring now to FIGS. 14–18, the operating arm 170 is illustrated in detail and includes an outer arm element 242 and an inner crank shaft 244 in which the outer arm element 242 is secured. As shown in FIGS. 1 and 14, the leading edge of the operating arm element 242 indicated at 246 has a concave-convex configuration that conforms generally to the thigh or the portion of the patron's body that makes contact with the arm element. The trailing edge of the outer arm element 242 indicated at 248 is generally convex and cooperates with the concave-convex leading edge 246 to produce an attractive yet functional design.

The inner end of the outer arm element 242 extends into a tubular elbow 256 that is formed as part of the crankshaft 244, the crankshaft 244 being secured to the driveshaft lower hub portion 174, as illustrated in FIG. 10. The inner end of the crankshaft tubular elbow 256 extends interiorly of the hub portion 174 and includes a groove 258 that communicates with opposed slots 260. Bordering the groove 258 is a split flange 262 to which an eccentrically located stub shaft 264 is joined. An exterior flange 266 is joined to the stub shaft 264 and is generally coaxial with the split flange 262.

As shown in FIGS. 10 and 14, spaced lugs 268 are formed on opposite sides of the elbow 256 and are longitudinally spaced from the flange 262. When the inner end of the crankshaft 244 is inserted in the opening formed in the annular flange 182 of the lower hub portion 174, the lugs 268 are moved within opposed slots 269 formed in the annular flange 182. In the assembled position of the operating arm 172, the flange 266 seats in a recess 270 formed in a thickened portion 272 of the lower hub portion 174 which defines the limit of inner movement of the operating arm crankshaft 244. The crankshaft 244 of the operating arm 170 is locked in place by a hasp 274 of a lock element 276, the hasp 274 extending into the groove 258. An adjusting screw 278 that extends through an opening 280 in the annular flange 182 is adapted to properly locate the hasp 274 in the groove 258 and guides the hasp into and out of the groove 258. A key shown in dotted lines at 282 may be inserted in the lock element 276 for releasing the hasp 274 when the direction of movement of the operating arm 170 is to be reversed. As will be described, when the operating arm is to be reversed, it must be rotated on its axis approximately 180°. In order to provide for this rotation, the operating arm is unlocked by rotating the hasp 274 out of the groove 258, so as to free the flange 262 for outer axial movement thereof. The entire operating arm is then pulled outwardly until the flange 262 engages a limit screw 283. At this point, the lugs 268 have cleared the slots 269 and the crankshaft 256 of the operating arm 170 may then be rotated on its axis to the reversed position thereof.

V. Door locking mechanism

In normal operation of the turnstile, the turnstile doors are adapted to be locked in their normally open or closed positions so that access therethrough can be accomplished only upon payment of a predetermined fare or token. It may also be desirable during operation of the turnstile to lock both sets of doors in the closed position thereof. When the operation of the turnstile is reversed, it is further necessary to lock the doors such that the doors that were normally open will be normally closed, and vice versa.

To accomplish the locking operation, a locking bar generally indicated at 284 is provided and as shown in FIGS. 2, 6 and 9, is slidably mounted on the main frame 56. The locking bar 284 includes a main body portion 286 that is formed with a downwardly projecting rear flange 288 which as shown in FIG. 2 envelops the counter tube 92. Integrally joined to the main body portion 286 are outwardly extending arms 290 and 292 that cooperate with the outer periphery of the main body portion to define an arcuate peripheral edge 294. Formed on the extreme outer edge of the arms 290, 292, are grooves 296, 298, respectively that are adapted to receive an upstanding locking roller 300 that is mounted on the outer reduced end 210 of the drive arm 198. As illustrated in FIGS. 2 and 6, the locking bar 284 is disposed vertically below the camming levers 230, 234 and the drive arm 198 so that the upstanding locking roller 300 may be received within either of the grooves 296 or 298 when the locking bar 284 is located in the outer or locked position thereof. In order to slidably support the locking bar 284 on the main frame 56, the rollers 120 and 122 (FIGS. 2 and 9) are provided and are secured to the upstanding lugs 116 and 118, respectively. Straps 302, 304, shown in dotted lines in FIG. 9 are secured in pockets 305, 306, respectively, formed on the underside of the locking bar, the straps 302, 304 overlying the rollers 120, 122, respectively, which project into the pockets 305, 306 and acting as bearing plates therefor. As will be described, the locking bar 284 is adapted to be moved longitudinally with respect to the longitudinal axis of the main frame 56, but also has limited sideways movement. In order to keep the locking bar 284 from moving too far off center, rollers 307 and 308 (FIG. 9) are mounted on the underside thereof just inside the lugs 116, 118, respectively. The rollers 307, 308 thus limit the sidewise travel of the locking bar and act to eliminate the drag on the lugs 116, 118.

Further supporting the locking bar 284 is a clevis joint defined by a lug 310 in which an opening is formed in the outer end thereof. Pivotally connected to the lug 310 by a pin 312 is a connecting element 314 that is also pivotally connected by a pin 316 to a solenoid 317 through a plunger 318. The plunger 318 is mounted for reciprocating movement in a solenoid coil 320 that is formed as part of a solenoid housing indicated at 322. The solenoid housing 322 is mounted on a plate 324 (FIG. 2) that is secured to the main frame 56 and thereby acts through the clevis joint to slidably support the rear end of the locking bar 284.

Secured to the main body portion 286 of the locking bar 284 adjacent the arcuate edge 294 is an upstanding rubber roller 326 that is adapted to be engaged by the outermost portion of the reduced end 210 of the drive lever 198 when the locking bar 284 is in the outer or locked position thereof. The roller 326 is normally engaged by the reduced outer end 210 of the drive lever 198 when the patron has passed through the turnstile and a trespasser enters the turnstile enclosure from the exit side. In this situation, a detecting device to be described will close an electrical circuit to cause the solenoid 317 to be deenergized which results in movement of the locking bar 284 to the outer or locking position. The roller 326 then moves in the path of the outer end 210 of the drive lever 198 and prevents the return of the drive lever 198 to its normally unlocked position. The doors 124, 126 thus remain closed and access by the trespasser through the turnstile is prevented. When the trespasser backs out through the doors 128, 130 the detecting device senses the absence of a body within the turnstile enclosure and the locking bar solenoid 320 is once again energized to withdraw the locking bar 284 to the unlocked position shown in FIG. 9, which position permits the drive lever 198 to return to the position shown in FIG. 6.

The locking bar 284 is normally urged toward the locking position and is substantially centered by curved flat steel springs 328 and 330 that are secured by pins 332, 334, respectively, to the main frame 56. The springs 328, 330 engage rollers 336 and 338, respectively, that are rotatably mounted on opposite marginal portions of the main body portion 286 of the locking bar 284. As seen in FIG. 6, the location of the rollers 336, 338 and the position of the springs 328, 330 engageable therewith cause the locking bar 284 to be normally urged outwardly toward the locked position. When the solenoid 317 is energized, the locking bar 284 is retracted to the unlocked position against the action of the springs 328, 330, the springs thereby being biased for automatically returning the locking bar 284 to the locked position when the solenoid 317 is de-energized.

Adjustment of the curvature of the springs 328, 330 is provided for by eccentrically mounted adjusting sleeves 340 and 342, respectively, which are mounted for rotation on the main frame 56. Rotation of the eccentric adjusting sleeves 340, 342 will adjust the degree of curvature in the springs 328, 330 and will increase or decrease the biasing action of the springs on the locking bar 284 as required.

*VI. Return spring assembly*

As described above, the doors 124, 126 and 128, 130 are normally disposed in an open and closed position, respectively, and are moved to a closed and open position, respectively (see FIGS. 23-25) during movement of the patron through the turnstile. In order to automatically return the doors to their normal position after the patron has passed through the exit doors 128, 130 a return spring assembly generally indicated at 344 in FIG. 10 is provided. The return spring assembly 344 includes a forward return spring 346 and a reverse return spring 348, the spring 346 being utilized for returning the doors to the normal position shown in FIGS. 6 and 23 and the spring 348 being utilized for returning the doors to the normal position when the direction of movement through the turnstile is reversed, as will be described. The return springs 346, 348 are wound from flat annealed spring steel, the convolutions being concentric with the drive shaft upper portion 86. The return springs 346, 348 are located within the depending flange 201 of the drive arm 198 and the peripheral edge of the portion 203 thereof, each spring being formed with a loop 350, 352, respectively, on the end of its outer coil (FIG. 19). A spring cover 353 is secured to the drive arm depending flange 201 by suitable bolts and encloses the springs 346 and 348 and a gear sleeve 354 splined to the hub 200.

In order to retain the return spring 346 in position and provide for adjustment of the tension thereof, the gear sleeve 354 is provided and as best shown in FIG. 11 is located in coaxial and encircling relation with respect to the depending hub 200 of the drive arm 198. Formed on the periphery of the gear sleeve 354 are a plurality of gear teeth 356 that are disposed in meshing relation with a pinion gear 358 that is secured to a stub shaft 360, the stub shaft 360 projecting through the upper portion of the drive arm 198 and into the depending hub 200 thereof. The gear sleeve 354 is secured to the inner coil of the spring 346 by a pin 362. The upper end of the stub shaft 360 is formed with an Allen head socket 364 into which an Allen wrench is adapted to be inserted. The tension of the spring 346 may then be adjusted by simply rotating the stub shaft 360. A ratchet gear 366 is secured to the upper end of the stub shaft 360 and engages a pawl 368 mounted on the upper surface of the drive arm 198. The pinion 358 is thus prevented from being driven rearwardly and the tension in the spring 346 is properly maintained.

The reverse return spring 348 is retained in position similarly in the manner just described in connection with the forward return spring 346. For this purpose, the inner coil of the reverse return spring 348 is secured to the gear sleeve 354 by a pin 370, while a pinion 372 mounted on a shaft 374 is disposed in meshing relation with the teeth 356 of the gear sleeve 354. Since the reverse spring return spring 348 is located below the forward return spring 346, the shaft 374 extends downwardly below the spring 348 as illustrated in FIG. 11. A ratchet wheel 376 is secured to the uppermost end of the shaft 374 and cooperates with a pawl 378 to prevent return movement of the shaft 374 and the pinion 372.

It is understood that when a patron enters the turnstile enclosure and moves therethrough thereby rotating the operating arm 170, the drive shaft 172, drive arm 198 and the gear sleeve 354 interconnected to the drive arm will also be rotated. Since the end of the return springs 346, 348 will move with the gear sleeve, the other ends thereof must be fixed in position in order that the springs be properly tensioned for returning the apparatus to the normal position thereof. For this purpose, a reversing bracket, generally indicated at 380 is provided and is fixed to the upper end of a vertically movable reversing sleeve 382, the purpose of which will be described hereinafter. Referring to FIGS. 10 and 13, the reversing bracket 380 is shown including a tapered top plate 384 formed with openings 386 through which bolts 388 extend for engagement with the uppermost end of the reversing sleeve 382. Joined at right angles to the top plate 384 and depending therefrom is a side plate 389 that is notched at 390 to form a tapered depending finger 392. Formed as an integral part of the side plate 389 is an extension 394 in which a slot 396 is formed and from which an upwardly extending tapered finger 398 projects. A pin 395 joined to the hub 200 projects through the slot 396 and acts to prevent rotation of the bracket 380. A switch arm 397 is adapted to be located on the underside of the extension 394 and projects inwardly for engagement with a double pole double throw reversing switch 399. The purpose of which will be described hereinafter. It will be noted that the projecting fingers 392 and 398 are spaced apart and are adapted to be engaged in the loops 350, 352 of the return springs 346, 348, respectively, depending on the direction of operation of the turnstile.

The finger 398 is thus located in engagement with the loop 350 when the turnstile is operating in the forward direction, or that direction indicated in the drawings. When patron movement through the turnstile is reversed, the doors are reversed in their operating position and as will be described, the relative angular positions of the reversing sleeve 382 and reversing bracket 380 are accordingly shifted. The sleeve 382 and reversing bracket 380 are then lowered by a reversing mechanism which causes the finger 398 to be removed from engagement with the loop 350 of the forward return spring 346, and the finger 392 to be downwardly moved into engagement with the loop 352 of the reverse return spring 348. As described above, both the loops 350, 352 are utilized to fix the outer end of their associated return springs for enabling the return springs to be tensioned during the initial movement of the turnstile doors as a patron passes through the enclosure.

*VII. Reversing Mechanism*

In order to vertically move the reversing bracket 380 when the direction of patron movement through the turnstile is reversed, a reversing mechanism is provided and is responsive to the reversing operation of the operating arm 170. Referring again to FIG. 10, the reversing mechanism is illustrated and includes a crank 400 that is formed with a split lower body 402 that is shaped to define an opening 404 through which the stub shaft 264 of the operating arm crank shaft 244 extends. Threadably engaged in an opening formed in the upper portion of the crank 400 is the lowermost end of a reversing rod 406 that is held in position by a set screw 408. The reversing rod 406 extends upwardly in coaxial relation within the intermediate sleeve 194 of the drive shaft 172 and is retained in position therein by a roller 410 that is inserted in a groove 411 through slot 412 and rotated with the rod 406 to a locking position on a flange 413. Disposed between the upper shaft portion 86 and the reversing sleeve 382 are spaced sleeve bearings 414 that are adapted to permit vertical movement of the reversing sleeve when the turnstile is reversed in operation. Formed in the reversing sleeve 382 intermediate the ends thereof is a slot 415 that receives a cam follower 416, the cam follower 416 being adapted to reverse the operation of the turnstile counters as will be described hereinafter. It is seen that rotation of the operating arm crank shaft 244 will cause the connecting rod 406 to be vertically moved, thereby causing a corresponding vertical movement of the reversing sleeve 382 and the reversing bracket 380. As shown in FIG. 10, the crank 400 is located in the upper position wherein the connecting rod 406 and reversing bracket 380 are also disposed in the upper position thereof. The finger 398 of the reversing bracket is thus located within the loop 350 and the turnstile is positioned for forward operation.

In carrying out the reversing operation of the turnstile, the operator first unlocks the turnstile by inserting a fare in the coin machine 49 or operating a key switch (not shown). He then proceeds through the turnstile to the furthest position wherein the exit doors 128, 130 are open and the inlet doors 124, 126 are closed. The lock 276 is then opened by the key 282 to release the hasp 274. The operating arm assembly is then pulled slightly outwardly and rotated 180 degrees from the full line position in FIG. 19 to the dotted line position illustrated therein. Rotation of the operating arm 180 degrees produces the corresponding downward movement of the reversing rod 406, the reversing sleeve 382 and the reversing bracket 380. The downward movement of the reversing bracket 380 forces the finger 398 out of engagement with the loop 350 of the forward return spring 346 and moves the finger 392 into engagement with the loop 352 of the reverse return spring 348. As will be described below, the same vertical movement of the reversing sleeve 382 drops the counter actuating cam 416 so that the proper turnstile counter will be actuated by the drive shaft to register patron movement through the turnstile. As will be further described, movement of the reversing bracket 380 also causes the switch arm 397 to be actuated for operating the reversing switch 398, thereby activating the proper fare cancellation switch and deactivating the fare cancellation switch used for the previous forward operation. The operating arm 170 is next moved inwardly and the lock 276 is relocked to secure the operating arm 170 in the new position thereof. The operating arm 170 is now located in the same angular relationship to the doors prior to the reversing rotation thereof, but is now adapted to be moved in the opposite direction for actuating the turnstile mechanism. It will be apparent that when the turnstile is reversed in operation for use as an exit, the coin machine 49 located on the entrance side is disconnected from the circuit of the turnstile unit. If the turnstile is used to control fare paying traffic in the reverse operation thereof, it is understood, that a coin machine will be placed on the pedestal 46 of the base member 26.

*VIII. Counter assembly*

Since it is desirable and usually necessary to count the number of patrons passing through the turnstile, a counter assembly is provided that is responsive to rotation of the drive shaft 172 as it is rotated by movement of the operating arm 170. Referring now to FIGS. 6, 10 and 19–22, the counter assembly is illustrated and includes a forward counter 418 and a reverse counter 420 that are normally enclosed within a housing 421 (FIG. 10), the housing 421 being mounted on the main frame 56.

The forward counter 418 which counts patron movement through the turnstile when the turnstile is operating in the normal direction is located in the cavity 98 between the upstanding members 422, 424 that are formed as an integral part of the main frame 56. A mounting plate 426 overlies the forward counter 418 and is secured to the upstanding members 422, 424 by suitable screws 428 and thereby locks the forward counter 418 in position. The underside of the forward counter 418 communicates with a window 430 formed in the web 96 of the main frame 56 and a window 432 formed in the canopy wall 434 that is secured to the underside of the main frame 56. The counter digits are thus externally visible and enable supervisory personnel to determine at a glance the amount of traffic moving through the turnstile.

Extending outwardly of the counter 418 through an opening in the upstanding element 424 is a shaft 436 that is operatively connected to the operating mechanism of the counter 418. A lever 438 is secured to the shaft 436 and has a pin 440 joined to the opposite end thereof.

The reverse counter 420 is mounted in the cavity 100 in a manner similar to that just described in connection with counter 418 and is located between upstanding elements 442 and 444. A mounting plate 446 overlies the reverse counter 420 and is secured to the elements 442, 444 by screws 448, thereby firmly securing the reverse counter 420 within the cavity 98. The window of the counter 420 is visible through a window 449 formed in the cavity 100 and through an opening 450 formed in the canopy wall 434. Projecting outwardly of the reverse counter 420 through an opening in the upstanding element 442 is a shaft 451 that is operatively connected to the operating mechanism of the reverse counter 420. A lever 452 is secured to the shaft 451 and has a pin 454 joined to the opposite end thereof.

Located between the opposed walls 115 and 117 of the web 96 and mounted on a cross shaft 456 is a cam operating lever generally indicated at 458 that has a bell crank shape. The shaft 456 is secured in opposed brackets 460 and 462 that are suitably joined to the web 96. The cam operating lever 458 includes a transverse webbed sleeve portion 464 through which the shaft 456 extends, an arm 465 being joined to the sleeve portion 464 and terminating in a cam follower 466. A forwardly and upwardly extending crank arm 467 is joined to the webbed sleeve portion 464 and as seen in FIG. 20 has a side lug 468, formed thereon intermediate the ends thereof and in which a slot 470 is formed (FIG. 10). The pin 440 is received within the slot 470 and is responsive to pivotal movement of the cam lever 458 to pivot the lever 438. The outer end of the crank arm 467 terminates in an enlarged portion 472 in one side of which a slot 474 is formed for receiving the pin 454 of the reversing counter 420. Thus, when the cam operating lever 458 is properly located, as will be described below, pivotal movement thereof will also result in pivotal movement of the lever 452.

Referring now to FIG. 10, a face cam 478 is shown secured to the exterior surface of the upper portion 86 of the drive shaft 172 and includes parallel ridges 480, 482 (FIG. 22) that define a cam track 484 therebetween, the cam track 484 being formed with high and low portions. FIG. 22 is a development of the face cam 478 and clearly illustrates the high and low portions of the cam track 484. Slots 486, 488 are formed in the opposite ends of the face cam 478 and receive bolts (not shown) therein that are adapted to mount the face cam 478 on the upper shaft portion 86. The face cam 478 is thus vertically shiftable in the slots 486, 488 which provide for limited vertical adjustment thereof. The face cam 478 further includes an inwardly projecting lug 490 that projects through an opening 492 formed in the upper shaft portion 86. Secured to the inwardly projecting lug 490 is the cam follower 416 that is disposed in the slot 415 and is responsive to vertical movement of the reversing sleeve 382 to control the vertical location of the face cam 478. When the face cam 478 is disposed in the upper position, as shown in FIG. 10, the turnstile is adapted to be operated in the forward direction and the finger 398 of the reversing bracket 380 is disposed in the forward spring loop 350.

In describing the operating of the counters 418, 420, it is assumed that the turnstile is set for the forward operation as shown in the drawings. Upon payment of a fare, the patron enters the turnstile enclosure and engages the operating arm 170 and upon continued forward movement pivots the operating arm ahead of him. The operating arm in this movement is traversed forward approximately 120°, thereby causing the drive shaft 172 and the face cam 478 secured to the upper shaft portion 86 to move a corresponding amount. As the cam track 484 formed on the face cam 478 is rotated, the follower 466 travels approximately three-eighths of an inch above the position shown in FIG. 10.

Movement of the cam follower 466 to the upper level of the cam track 484 causes the cam operating lever 458 to pivot about the shaft 456 approximately 12°. Each of the counters 418, 420 is constructed such that initial rotation of the operating shaft thereof in one direction "cocks" the counter operating mechanism and a corresponding opposite movement of the operating shaft causes the operating mechanism to register accordingly when the cam operating lever 458 is pivoted by the forward movement of the operating arm 170, the counter operating shaft 436 is rotated to "cock" the operating mechanism within the forward counter 418. Upon release of the operating arm 170 by the patron as he exits from the turnstile, the doors and operating arm 170 are returned to the normal position thereof by the forward return spring 346. The face cam 478 is lowered to the position shown in FIG. 10, and the cam operating lever 358 is pivotally moved back to its original position. The counter operating shaft 436 is then rotated in the opposite direction, whereupon the precocked operating mechanism is released to register a count.

During the operation of the forward counter 418, the reverse counter 420, which is adapted to count patron movement through the turnstile in the opposite direction, is inoperative. This is accomplished by presetting the counter operating mechanism such that the length of travel of the cam operating lever 458 during the pivotal movement thereof is ineffective to result in actuation of the operating mechanism of counter 420. Hence, when the face cam 478 is located as shown in FIG. 10, the range of pivotal movement of the cam operating lever will not be sufficient to preset or cock the operating mechanism of the counter 420; the corresponding return movement of the cam operating shaft will thus be ineffective to cause the counter 420 to register a count.

The operating range of the counters 418, 420 is best illustrated in FIG. 10, wherein the positions of pivotal movement of the pin 440 secured to the lever 438 of the counter 418 is indicated at 1, 2 and 3 and the positions of pivotal movement of the pin 454 secured to the lever 452 of the counter 420 is indicated at $a$, $b$ and $c$. When the face cam 478 is located in the position for forward count, the pin 440 is moved between positions 1 and 2. This is the operating range of the forward counter 418 and a count will be produced. During forward operation of the turnstile, the pin 454 is moved between positions $a$ and $b$ by the cam operating lever 458, but this movement is ineffective to cause the counter 420 to register a count.

When the turnstile operating mechanism is reversed, the reversing shaft 382 is lowered. Since the follower 416 is located on the lower surface of the slot 415 formed in the reversing sleeve 382, the follower 416 will also be moved downwardly, the slot 492 formed in the upper shaft portion 86 permitting the downward movement and acting as a lower limit when the lug 490 to which the face cam 478 is secured reaches the lower edge thereof. It is seen that the downward travel of the face cam 478 results in a pivotal movement of the cam operating lever 458 and the pins 440 and 452 operatively connected to the forward and reverse counters are repositioned for their pivotal movement. The pin 440 now operates between positions 2 and 3 as the turnstile operating arm is rotated; but since the forward counter 418 is preset to count only between positions 1 and 2, movement of the cam operating lever 458 will be ineffective to produce a count in the forward counter. However, the reverse counter 420 is preset to count between positions $b$ and $c$ and upon the initial movement of the operating arm 170 the operating mechanism of the counter 420 will be "cocked" as the pin 454 reaches the position $c$. Upon release of the operating arm by the patron, the pin 454 will return to the $b$ portion, thereby pivoting the lever 452 and causing the shaft 451 to rotate for producing the counting operation in the counter 420.

As illustrated in FIG. 2, the transaction counter 94 is mounted on the main frame 56 within the chamber 92 and includes a shaft 494 that is operatively connected to the locking bar 284 through a roller arm 496 and a roller 498. The roller 498 is captured between the cast ears 500 that depend from the main body portion 286 of the locking bar 284, the roller 286 being responsive to the linear movement of the locking bar to actuate the counter 94.

The transaction counter 94 only counts the number of times that the locking bar 286 is pulled out of locking position and, therefore, would not necessarily indicate the number of patrons actually passing through the turnstile. A comparison of the transaction counter 94 and the forward or reverse counters 418, 420 would serve as a check to determine whether fares were being inserted in the coin machine and were being registered. This would indicate whether patrons actually passed through the turnstile or backed out or whether the fares were registered before the locking bar had a chance to drop out to the locking position.

IX. Fare cancellation switches

When a patron passes through the turnstile and the doors are returned to their normal position, it is necessary to deenergize the solenoid 317 which will cause the locking bar 284 to lock the drive arm 198 in the normal position thereof or that position illustrated in FIGS. 6 and 23. In this position, the doors 124 and 126 are open and the doors 128 and 130 are closed. It is, of course, understood that if the turnstile is being operated in the reverse direction, doors 128, 130 would be normally closed. Referring again to FIG. 6, forward and reverse cancellation switches 502 and 504, respectively, are shown mounted in the recesses or cavities 106 and 108, respectively, and are located adjacent the forward and reverse counters. Mounted on the spring cover 353 and movable with the hub 200 of the drive arm 198 are spring mounted roller assemblies, generally indicated at 505 and 506, that are adapted to actuate the switches 502 and 504, respectively, as will be described. The internal structure and operation of the cancellation switches 502 and 504 are identical and each switch includes a rotary input shaft 507 on which a pawl 508 is mounted. The pawl 508 includes a first cam edge 509 and a second cam edge 510 that are adapted to be successively engaged by a roller assembly.

The roller assemblies 505, 506 are similarly constructed and each includes a spring mounted roller 512. The roller 512 (FIG. 8) of each roller assembly is adapted to successively engage the cam edges 508 and 509 of the pawl 508 of the appropriate switch as the drive arm 198 is rotated and reversed and is mounted in a bracket 514. As shown in FIG. 8, the bracket 514 is fixed to the underside of the spring cover 353 by a bolt 516 that extends through an opening in the bracket 514, the bolt 516 being fixed in the bracket 514 by a lock washer 518. A coil spring 520 is mounted on the bolt 516 in a recess defined by the end walls of the bracket, one end 522 of the spring 520 engaging the outer wall of the bracket and the other end 524 of the spring engaging a pin 526 that is fixed in the bracket and in the depending flange 201 of the drive arm 198.

As will be described, the roller 512 that is mounted for pivotal movement in one direction will strike the cam edge 509 of the pawl 508 on initial movement of the operating arm 198 and will be pivoted in a counter-clockwise direction, as seen in FIGS. 6 and 7, wherein the position of the cancellation switch input shaft 507 remains unchanged during this initial movement of the drive arm 198. Upon return movement of the drive arm 198, after the patron has exited from the turnstile and has released the operating arm 170, the roller 512 strikes the cam edge 509 and in this instance will not pivot and will thus cause the pawl 508 to rotate the input shaft 507 of the switch 502. Continued movement of the drive arm 198 causes the roller 512 to strike the cam edge 510 thereby returning the pawl 508 to the initial position thereof.

The roller 512 and pawl 508 for the forward cancellation switch 502 and the corresponding roller and pawl for the reverse cancellation switch 504 are arranged so that the forward cancellation switch 502 acts to close a circuit to deenergize the locking bar solenoid 317 only on forward operation of the turnstile or clockwise rotation and reverse of the drive arm 198, as seen in FIG. 6. The reverse cancellation switch 504 is conversely adapted to close a circuit to deenergize the solenoid 317 when the turnstile is set for reverse operation and when the drive arm 198 is moved in a counter-clockwise direction and reversed as seen in FIG. 6. In every cycle of operation, both switches 502 and 504 are actuated. However, only one switch is connected in the control circuit, this connection being determined by the position of the reversing switch 399 that is controlled by vertical movement of the reversing bracket 380. The input shafts 507 of both cancellation switches 502, 504 are rotated when sufficient pressure is impressed thereon to overcome an internal detent spring. This occurs when the drive arm 198 returns to the normal position thereof, and the roller 512 of each roller assembly strikes the respective cam edge 510, of each switch. Continued return movement of the drive arm 198 causes each switch to snap to the opposite pole as the input shaft 507 thereof is rotated in response to engagement of the cam edge 509 by the respective roller 512. The cancellation operation that drops out the solenoid and returns the locking bar to the locking position thereof is thus a two-step procedure, and as will be described hereinafter in connection with the electrical circuit illustrated in FIG. 26, a first pulse is produced on initial movement of the pawl 510 as the drive arm 198 is returned to the normal position to actuate a relay that sets up the circuit. Upon return movement of the pawl 510 after the cam edge 509 has been engaged by the roller 512, the switch is returned to the normal position and a second relay is actuated that cancels the fare and deenergizes the solenoid 317, wherein the locking bar 284 is restored to the locked position thereof.

X. Detecting device

When the turnstile is employed as an exit unit, such as units 14 or 16 in FIG. 1, it is necessary to prevent would-be trespassers from illegally gaining entrance to the train area by slipping into the turnstile enclosure through the open exit doors as a patron exits therefrom. In this instance, unless some provision is made for locking the front doors, they will open to allow the trespasser to freely enter the train area. In order to prevent such occurrences, a detecting device is provided and, as will be described in connection with FIG. 26, is electrically interconnected to the locking bar solenoid 317. Referring again to FIG. 2, a light cell 527 is mounted in the upper portion of the space reducing panel 144 and is externally exposed by an opening formed in the upper inclined wall of the space reducing panel. Located interiorly of the space reducing panel is a housing 528 that is electrically connected to the light cell 527 and that houses a control circuit for controlling the operation of the light cell 527. Mounted on the right-hand side of the main frame 56, as seen in FIG. 2, is a receiver 529 that is provided with a light sensitive element that is aligned with the light cell 527 in the space reducing panel. The receiver 529 includes a normally closed switch (FIG. 26) that is adapted to be opened for deenergizing the solenoid 317 whenever the area between the light cell 527 and the receiver 529 is occupied during return movement of the operating arm 170. In order to preset the circuit electrically interconnected to the detecting receiver 529 so as to provide for operation of the detecting device only upon return movement of the operating arm 170, switches 530 and 531 are provided and are mounted on the casting of the main frame 56. The switches 530 and 531 are similar in construction to the fare cancellation switches 502, 504 and as shown in FIG. 6 are adapted to be actuated by the rollers 512 of the roller assemblies 505 and 506, respectively. Switch 530 is provided for forward operation of the turnstile while switch 531 is provided for reverse operation of the turnstile and, as shown in FIG. 26, these switches are electrically connected in parallel in a circuit that is adapted to control the operation of the turnstile solenoid 317, when the turnstile is used as an exit unit. As will be more fully described in connection with the electrical circuit in FIG. 26, the detecting device is adapted to detect the presence of a mass within the turnstile enclosure only upon return movement of the operating arm, or after a paid patron has exited from the turnstile, and thus acts to cause the circuit to the solenoid 317 to be broken. This deenergizes the solenoid 317 and causes the locking bar 284 to move to the locking position for preventing the entrance doors from returning to their normally open position. When the trespasser backs out of the enclosure, the receiver 529 will detect the removal of the mass, and the solenoid 317 will be energized to retract the locking bar 284, thereby permitting the entrance doors to open and the exit doors to close.

Although not shown, other forms of people detecting devices are contemplated for use with the apparatus embodied herein. One such modified form of detecting structure is the use of a one-way clutch that is installed in the drive shaft 172. If the clutch is operated in the intended manner, the clutch discs will simply revolve and the turnstile unit operates as described above. However, if a trespasser should attempt to move through the turnstile unit, he will engage the operating arm thereby applying pressure to the clutch discs to cause one of the discs to move outwardly, thereby closing a switch corresponding to the switch in the detecting receiver 529. A circuit to the solenoid 317 is then closed by way of the proper fare cancellation switch to deenergize the solenoid 317, thereby causing the locking bar 284 to spring outwardly and prevent the entrance doors from moving to the normally open position.

A further modified form of detecting device that is contemplated utilizes a pressure sensitive pad that is located on the floor of the turnstile enclosure between the base members 24, 26. The pressure sensitive pad would be arranged to detect the weight of a trespasser after the doors begin to return to their normal position and after the paid patron had passed through the unit. A switch located in the pad corresponding to the switch in the detecting receiver 529 would be closed and would cooperate with the appropriate fare cancellation switch that has been actuated to deenergize the solenoid 317, thereby causing the locking bar 284 to move outwardly to the locking position, wherein the doors would be prevented from returning to the normal positions thereof.

A still further modified form of detecting device would incorporate a capacitance device in the interior of the operating arm 170. The capacitance device would detect the presence of a mass within the turnstile interior and upon return movement of the doors would be responsive to the operation of the appropriate fare cancellation switch to cause a switch to be closed that would in turn open the circuit to the solenoid 317, thereby permitting the locking bar 284 to return to the locking position thereof.

It is also contemplated to utilize a sonar or sound wave system wherein a transmitter would emit a continuous sound wave that would blanket the turnstile enclosure. After the proper fare cancellation switch has been actuated upon return movement of the drive arm 198, if a mass is located within the enclosure, the interruption of the sound waves will be detected by the sonar system to cause a switch to close, thereby deenergizing the solenoid 317 and causing the locking bar to move outwardly to prevent further movement of the doors to their normal position. Removal of the mass, or in this case, a trespasser from the turnstile enclosure will cause the solenoid 317, to be energized once again to withdraw the locking bar 284 to the unlocked position. The doors are then permitted to return to the normal position thereof.

XI. Canopy Structure

As described hereinabove, the entire operating mechanism for the turnstile is located above the doors which is contrary to the location of the operating mechanism of the turnstile devices known heretofore. In order to house the operating mechanism but to afford easy access thereto, canopy assembly 57 is provided. Referring now to FIGS. 4, 5, 5a and 9, the canopy assembly 57 as shown includes a cover 532, one portion of which defines the upper wall of the turnstile, the upper wall of the canopy cover preferably being located in close fitting relation to the ceiling or other abutment under which the turnstile unit is mounted. Joined to each side wall of the cover 532 in overlapping relation (FIG. 5) is an extension plate 533, the plate 533 and lower edge of the cover 532 cooperating to define a slot for receiving the edge of the lamp diffusion plate to be described. As described above, the main frame 56 is enclosed within the canopy assembly 57 and defines the base therefor. Secured to the underside of the main frame 56 is the arched canopy wall or plate 434 that conceals the operating mechanism within the canopy assembly 57 and lends a finished appearance to the assembly. It is understood that appropriate slots are formed in the portion of the canopy plate 434 that overlies the slots 430, 432, thereby providing for external viewing of the digit wheels of the counters 418, 420. The canopy assembly 57 is symmetrical in construction from front to rear and it is understood that the portion of the canopy assembly 530 illustrated in FIG. 4 represents only one half of the complete assembly. The elements of the canopy assembly 57 to be described hereinbelow represent only those elements for the exit side of the turnstile. Since the turnstile is reversible in operation, the entrance or forward side is identically constructed. As shown in FIGS. 4 and 9, a lamp bracket 536 is secured to the cover 532 by a rivet or screw 538 and includes spaced plates 540 and 542 that have convenient lamp holders 544 secured thereto. Ballasts (not shown) are secured to the lamp bracket 536 in any suitable manner. Fluorescent lamps 546 are mounted in the lamp holders and span the width of the turnstiles for lighting the entrance and exit thereof.

Secured to the lamp bracket 536 by a clamping unit 548 and to the main frame 56 by pins 550 joined to the main frame casting is a mechanism access panel 552 that is conveniently removable when access to the operating mechanism is required. Covering the mechanism access panel 552 and the lamp bracket 536 is a lamp diffuser panel 554 that is formed of a translucent material for admitting light from the lamps 546. The lamp diffuser panel 554 has a concave lower wall 556 that slopes downwardly and rearwardly, terminating in a rear edge 558 that is secured between the lower edge of the main frame 56 and the canopy plate 534. Integrally joined to the lower wall 556 of the diffuser panel 554 is an inclined upwardly extending front wall 560 that has a shortened upwardly extending vertical portion 561 joined thereto (FIG. 5a). Sandwiching the vertical portion 561 therebetween is an outer trim strip 562 and an inner channel shaped lock strip 564 which are secured together by a plurality of spaced rivets 565. Secured to the outer ends of the diffuser panel 554 and the lock strip 564 are brackets 566 that are formed with openings 567 therein.

A lock assembly 568 extends through the trim strip 562 and lock strip 564 and includes a lock cam 569 (FIG. 9) that is adapted to be rotated by the lock assembly 568 when a key 570 is inserted in the lock assembly and turned. Connected to the lock cam 569 are oppositely extending rods 572, 574, the outermost ends of which are adapted to project through the openings 567 formed in the brackets 566 and through suitable openings formed in the extension plate 533, thereby locking the diffuser panel 554 in the canopy assembly. It is seen that the diffuser panel 544 may be easily removed from the canopy assembly 57 by simply rotating the lock assembly 568 which unlocks the rods 572, 574 from their locked position. The operating mechanism may then be reached by rotating the clamping nut 548 which provides for removal of the mechanism access panel 552. Although not shown, information signs indicating "entrance" and "exit" may be placed behind the front wall 560 of the diffuser panel 554 and would be changed as required, depending upon the direction of patron movement through the turnstile unit.

XII. Operation

In describing the operation of the turnstile unit 10, reference is made to FIG. 26 which is a diagrammatic illustration of the electrical circuit embodied in the present invention. Referring also to FIGS. 23, 24 and 25, it will be assumed that the turnstile unit is located for forward operation and the doors 124, 126 and 128, 130 are disposed in the positions illustrated in FIG. 23. As a patron approaches the turnstile unit, he will deposit a predetermined amount of coins or a token into the coin machine 49. The coin machine 49 which is generally of that type illustrated and described in copending application Serial No. 55,256, causes a series of pulses to be produced that are registered by a counting chain in a computer that is electrically interconnected to the coin machine 49. It is understood that for purposes of illustration both the coin machine and computer are illustrated in diagrammatic form in FIG. 26. If the coins or token deposited are sufficient to total a correct fare, the counting chain in the computer will produce an electrical pulse that will energize a fare paid relay R1. Contacts R1a will then close to cause relay R2 to be energized. When relay R2 is energized, contacts R2a are closed to complete a circuit through line 540, the switch in the detecting device 529, line 542, the closed forward contact 544 of the reversing switch 399, line 546, the normally closed contacts of the forward fare cancellation switch 502, line 548, line 550, the normally closed contacts R4a to the relay R3. Contacts R3a are then closed to complete a circuit from the computer through a line 544 to the turnstile solenoid 317. The solenoid is energized and withdraws the locking bar 248 to the unlocked position thereof, thereby releasing the drive arm 198 for movement. The patron has now entered the turnstile enclosure and engages the operating arm 170. Continued forward movement of the patron against the operating arm causes the operating arm to pivot rearwardly thereby rotating the drive shaft 172 and the drive arm 198. As the drive arm 198 rotates to the position illustrated in FIG. 24, the transfer arm 218 and the camming lever 230 are pivoted to move the doors 124 and 126, respectively, to the closed position thereof. During this initial movement of the drive arm 198, the transfer arm 220 and camming lever 228 remain in their original position, whereupon both sets of doors are closed as seen in FIG. 24, and the patron is momentarily enclosed within the turnstile enclosure. By providing for the momentary enclosing of the patron, illegal entry into the turnstile enclosure is prevented, and furthermore the enclosure is reduced to its smallest capacity. Thus, if a trespasser has entered the turnstile enclosure with a paid patron, the limited space in the enclosure defined by both sets of doors will prevent the doors 126, 128 from closing which will, in turn, prevent the operating arm 170 from being further moved. In order to open the doors 128, 130, the trespasser must back out, which will free the operating arm for further forward movement. As the patron continues his forward movement through the turnstile, the operating arm 170 is moved to a position that completes approximately a 120° movement from the fully open entrance position to the fully open exit position. In the fully open exit position shown in FIG. 25, the drive arm 198 has moved the doors 128, 130 to the open position, while the doors 124, 126 remain closed to block access against illegal entry into the turnstile. The patron then exits through the doors 128, 130 and releases the operating arm 170.

When the patron leaves the turnstile on the exit side, the forward return spring 346 is released from the tensioned position thereof and causes the drive shaft 172 to return to its original position, thereby forcing the operating mechanism, the turnstile doors and the operating arm to similarly return to the normal positions thereof. As the drive arm 198 returns in response to the reactive movement of the spring 346, the roller 512 of the forward roller assembly 505 will engage the cam edge 509 of the pawl 508 when the operating arm 170 passes the central position by 6°. The forward fare cancellation switch 502 will then be actuated to open the circuit between lines 546 and 548 (FIG. 26). However, the relay R3 will still remain energized since the line 550, the switch in the detecting receiver 529, contacts R2a and line 540 constitute a holding circuit therefor. Since the contacts in the forward fare cancellation switch 502 are shifted by rotation of the pawl 508, a circuit to relay R4 is established from a source of positive potential, line 552, normally closed contacts 554 in the reversing switch 399, line 556, the normally open contacts in the fare cancellation switch 502 and line 558. The normally closed contacts R4a are then opened to deenergize relay R3. Contacts R3a are now opened to cause the solenoid 317 to deenergize, thereby releasing the locking bar 284. The locking bar 284 thereafter moves outwardly to the locking position thereof. When the relay contacts R3a are opened to deenergize the solenoid 317, the computer circuit is reset to deenergize relay R1. Relay R2 is then deenergized to open contacts R2a and the circuit is reset for reception of the next fare in the coin machine 49.

It will be noted that upon continued rearward travel of the drive arm 198 the roller 512 of the forward roller assembly 505 strikes the cam surface 510 and resets the contacts of the forward fare cancellation switch 502. It will also be noted that since the reversing bracket 380 is located for forward operation of the turnstile, the reversing switch 399 is set for similar operation.

As the drive shaft 172 rotates in response to patron movement through the turnstile, the forward counter 418 which is located in its operable range will be actuated on the return stroke of the drive shaft to register the forward patron flow through the turnstile.

The turnstile is eventually returned to the original or starting position when the forward return spring 346 causes the operating mechanism to open the doors 124, 126 and to close the doors 128, 130. As described above, upon return movement of the drive arm 198, the circuit to the locking bar solenoid 317 is opened, thereby causing the solenoid 317 to be deenergized and the locking bar 284 to move outwardly to the locking position thereof.

If it is required to reverse the operation of the turnstile, the doors are reversed in their normal position and the operating arm 170 is rotated on its axis to drop the reversing shaft 382 and the reversing bracket 380. The forward return spring 346 is thus disconnected from engagement with the reversing bracket 380, while the reverse return spring 348 is connected thereto. The counter 418 is moved to its inoperable range while the reverse counter 420 is conversely moved to the operable range thereof. In the electrical circuit, switches 544 and 554 are shifted in response to downward movement of the reversing bracket 380 to locate the reverse fare cancellation switch 504 in the circuit and to simultaneously disconnect the forward fare cancellation switch 502 therefrom. The operation of the turnstile and the circuit in reverse is identical to that just described, it being understood that patron movement through the turnstile is reversed with respect to normal flow therethrough.

On those occasions when it is desirable to utilize the turnstile as an exit unit only, the doors are reversed as just described, but since the deposit of a fare is unnecessary for those patrons using the unit to exit from the station, the coin machine housing 49 is not connected for operation. As the patron enters the turnstile enclosure for exit from the station, he must be allowed to pass freely therethrough and therefore the solenoid 317 must be normally energized to retain the locking bar 284 in an unlocked position. For this purpose, a relay R6 is provided and is adapted to be energized for connecting a source of A.C. power to the solenoid 317 through a line 560, contacts R6a and a line 562. The relay R6 is connected to a source of A.C. power through a switch SW1 that is manually closed when the turnstile is to be employed as an exit unit, and the normally closed contacts R5a.

When the turnstile is used as an exit unit, the switch in the detecting receiver 529 of the detecting device is normally open with respect to the line 564 located in circuit with the relay R5. The other side of the switch in the detecting receiver 529 is adapted to be connected in circuit to the D.C. power source through normally open contacts R6b and either the forward detecting switch 530 or the reverse detecting switch 531. Assuming that the turnstile is operating as an exit unit for traffic movement in a reverse direction or permitting outward flow of traffic from the subway station as illustrated at units 14 and 16 in FIG. 1, the switch 531 will be closed when the doors 124, 126 have closed after exit of the patron therethrough. Since contacts R6a are closed when manual switch SW1 is closed, the detecting receiver 529 is then ready to detect illegal entry of trespasser who may have entered the turnstile enclosure. Assuming now that the trespasser enters the enclosure by holding doors 124, 126 open after a patron exits therethrough, the doors 124, 126 will then normally close prior to the opening of the doors 128, 130. Simultaneously, with the closing movement of doors 124, 126, the operating arm 170, drive shaft 172 and drive arm are all returned toward their normal position by the reverse return spring 348. When the drive arm 198 has travelled approximately 54° from start of return movement or 6° before center, all four doors are closed and the switch 531 is actuated to complete the circuit to one side of the detecting receiver switch. Since the trespasser occupies the space between the doors, the detecting receiver will be energized to produce a pulse that will close the switch therein. Relay R5 is then energized to open contacts R5a. Relay R6 is deenergized to open contacts R6a and thereby open the circuit to the solenoid 317. The locking bar 284 is thus released and moves outwardly to the locking position to lock the doors 128, 130 in the closed position. Since the trespasser cannot enter the subway station, he must back out and leave the turnstile through the doors 124, 126 through which he entered. Upon removal of the mass within the enclosure, the detecting receiver switch will once again open to break the circuit to relay R5. Normally closed contacts R5a are closed again to energize relay R6 which completes the circuit to the solenoid 317. The locking bar 284 is then retracted to permit normal free exit from the turnstile. Although not described, it is understood that the detecting device may be utilized in normal operation of the turnstile either in forward or reverse direction. In such instances the turnstile could be employed in a zone fare system wherein fares would be paid upon entering or leaving the turnstile depending upon the existing conditions. Since the coin machine or similar fare collection device would be connected for operation, a modified circuit would be employed with the detecting device that would enable the turnstile solenoid to be deenergized whenever the switch in the detecting receiver were closed as a result of illegal entry into the turnstile encolsure.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a fare collection station, a fare collection machine, a turnstile unit located adjacent said fare collection machine including an entrance door assembly and an exit door assembly, an operating mechanism interconnected to said entrance and exit door assemblies for coordinating the movement thereof, an operating assembly responsive to movement of a patron into said turnstile unit and interconnected to said operating mechanism for causing said operating mechanism to operate said door assembles, wherein said entrance door assembly is moved from a normally open position to a closed position and said exit door assembly is moved from a normally closed position to an open position, means operatively connected to said door assemblies for returning them to the normal position thereof after said patron has passed through said turnstile unit, said door assemblies defining an enclosure into which the patron enters, said operating assembly including an operating arm that projects into said enclosure and into the path of the patron entering said enclosure, said operating arm being movable by the patron upon passage through the enclosure to cause said operating mechanism to operate said door assemblies.

2. In a fare collection station, a a fare collection machine, a turnstile unit located adjacent said fare collection machine including an entrance door assembly and an exit door assembly, an operating mechanism interconnected to said entrance and exit door assemblies for coordinating the movement thereof, an operating assembly responsive to movement of a patron into said turnstile unit and interconnected to said operating mechanism for causing said operating mechanism to operate said door assemblies, wherein said entrance door assembly is moved from a normally open position to a closed position and said exit door assembly is moved from a normally closed position to an open position, means operatively connected to said door assemblies for returning them to the normal position thereof after said patron has passed through said turnstile unit, said door assemblies defining an enclosure into which the patron enters, said operating assembly including an operating arm that projects into said enclosure and into the path of the patron entering said enclosure, said operating arm being movable by the patron upon passage through the enclosure to cause said operating mechanism to operate said door assemblies, and means for reversing the normal location of said operating arm and the operation of said turnstile so that the normally open door assembly is normally closed and the normally closed door assembly is normally open, whereupon the patron entrance and exit movement through the turnstile enclosure is reversed.

3. In apparatus for controlling access through a pay station, a first barrier, a second barrier spaced from said first barrier and defining an enclosure therewith, said barriers being normally positioned such that a patron seeking admission through said pay station moves past said first barrier but is prevented from further movement by said second barrier, means for locking said barriers in the normal position thereof, means responsive to the deposit of fare means by said patron in a fare control means for releasing said locking means, said first barrier being responsive to the operation of said releasing means and to movement of the patron into said pay station for movement to a closed position while said second barrier remains closed, said second barrier being responsive to further movement of said patron through said pay station for movement to an open position while said first barrier remains closed, the patron having exit access through the open second barrier.

4. In apparatus as set forth in claim 3, means for returning said barriers to the normal positions thereof after exit of said patron from said pay station.

5. In apparatus as set forth in claim 4, means responsive to the returning movement of said barriers for actuating said locking means for relocking said barriers in the normal positions thereof.

6. In apparatus as set forth in claim 3, means for reversing the normal positions of said barriers when the direction of patron movement through the pay station is reversed.

7. In apparatus as set forth in claim 3, operating means operatively interconnected to said locking means and to said releasing means, said operating means being located vertically above said barriers and being interconnected to said barriers for producing the movement thereof as said patron advances through the pay station.

8. In apparatus as set forth in claim 7, an operating arm located between said barriers and operatively interconnected to said operating means, said operating arm being responsive to movement of the patron thereagainst for producing operation of said operating means and movement of said barriers.

9. In a turnstile, a base, a canopy assembly vertically spaced above said base, a first door assembly mounted between said canopy assembly and said base to define an entrance to said turnstile, a second door assembly mounted between said canopy assembly and said base to define an exit from said turnstile, said entrance and exit door assemblies being spaced from each other to define a confined area through which a patron must pass when moving through said turnstile, said entrance door assembly being normally open and said exit door assembly being normally closed, and means responsive to movement of said patron into said confined area for momentarily closing said entrance door assembly while said exit door assembly remains closed and then opening said exit door assembly while said entrance door assembly remains closed, and means for returning said entrance and exit door assemblies to the normal positions thereof after said patron has moved out of said turnstile.

10. In a turnstile as set forth in claim 9, said opening and closing means including an operating arm that is engaged by the patron in said confined area, and a door operating mechanism essentially located in said canopy assembly and operatively connected to said door assemblies, and said door operating mechanism being responsive to movement of said operating arm for moving said exit and entrance door assemblies in sequential relation to the open and closed positions thereof, respectively.

11. In a turnstile as set forth in claim 10, said canopy assembly including a main frame on which said door operating mechanism for controlling movement of said door assemblies is mounted, and means mounted on said main frame for locking said door assemblies in the normal positions thereof.

12. In a turnstile as set forth in claim 11, means mounted on said main frame and responsive to the movement of said operating arm for counting the number of patrons passing through said turnstile.

13. In a turnstile as set forth in claim 10, means for reversing the direction of normal patron movement through said turnstile, said reversing means including means responsive to rotation of said operating arm to a reverse position for reversing said returning means, wherein the normally open door assembly is located in a normally closed position and the normally closed door assembly is located in a normally open position.

14. In a turnstile unit, a first set of doors that are normally disposed in an open position and define an entrance to said turnstile unit, a second set of doors that are normally disposed in a closed position and define an exit from said turnstile unit, operating means responsive to movement of a patron past said first set of doors for causing said first set of doors to move to a closed position while said second set of doors remain closed, wherein said patron is briefly confined within an enclosure that is defined between said sets of doors, said second set of doors being moved to an open position by said operating means upon further movement of said patron while said first set of doors remains closed thereby preventing access by other patrons through said turnstile unit when said first person is passing therethrough, and means for returning said first set of doors to the normally open position thereof and said second set of doors to the normally closed position thereof after said first patron has passed through the turnstile unit on the exit side thereof.

15. In a turnstile unit as set forth in claim 14, means for locking said operating means against movement so as to locate said sets of doors in the normal positions thereof, and a fare collection machine located on the entrance side of said turnstile and responsive to deposit of a preselected fare therein for releasing said locking means from the locked position so that said sets of doors are movable to provide for passage of said patron through said turnstile unit.

16. In a turnstile unit as set forth in claim 14, said operating means including an operating arm located between said door assemblies for contact by said patron upon entering said turnstile unit, a drive shaft operatively connected to said operating arm and responsive to movement thereof and a door operating linkage located above said sets of doors and operatively connected to said drive shaft and to said sets of doors for transferring movement of said operating arm into movement of said doors.

17. In a turnstile unit as set forth in claim 16, a locking bar operatively associated with said door operating linkage for normally retaining said linkage in a locked position, wherein said sets of doors are locked in the normal position thereof, and means for releasing said locking bar from the locked position thereof to unlock said linkage whereby said sets of doors are permitted to move in response to the movement of said operating arm as said patron passes through said turnstile unit.

18. In a turnstile, a base, a canopy assembly including a main frame mounted over said base in spaced relation with respect thereto, a first pair of normally open doors pivotally mounted between said main frame and base and defining an entrance to said turnstile, a second pair of normally closed doors pivotally mounted between said main frame and base and defining an exit from said turnstile, a door operating assembly for operating said doors and including an operating member disposed between said pairs of doors and located in the path of a patron passing through said turnstile for contact thereby, a drive shaft operatively connected to said operating member and extending vertically with respect thereto terminating at said main frame, a door operating linkage located in said canopy assembly and operatively connected to said drive shaft and responsive to movement thereof as said patron moves said operating member to sequentially close said first pair of doors and open said second pair of doors, and means for returning said doors to the normal positions thereof after said patron has passed through said turnstile.

19. In a turnstile as set forth in claim 18, means mounted on said main frame and operatively connected to said door operating linkage for locking said linkage in a position wherein said doors are in the normal position thereof, and means for releasing said locking means wherein said doors are free to be moved sequentially by movement of said operating member.

20. In a turnstile as set forth in claim 19, a fare collecting machine located adjacent the first set of doors, said releasing means operatively interconnected to said fare collecting machine and responsive to a signal produced by the deposit of a predetermined fare therein for releasing said locking means from the locking position thereof.

21. In a turnstile as set forth in claim 20, means mounted on said main frame and responsive to movement of said operating member in a return direction for cancelling the signal produced by said fare collecting machine, wherein said locking means is returned to the locking position thereof and said doors are locked in their normal positions.

22. In a turnstile as set forth in claim 18, said door operating linkage including a drive arm operatively connected to said drive shaft for movement thereby, at least one camming lever interconnected to said drive arm and to one of said doors, and a transfer arm interconnected to said drive arm and to another of said doors said camming lever and transfer arm being pivotally movable in response to movement of said drive arm to pivot said doors during movement of a patron through said turnstile.

23. In a turnstile as set forth in claim 18, said returning means including a spring operatively interconnected to said drive shaft and being compressed upon rotary movement of said drive shaft in response to movement of said operating member by said patron, said spring being adapted to return said drive shaft to the normal position thereof upon release of said spring from the compressed position thereof after said patron has passed through said turnstile wherein said doors are returned to the normal position thereof.

24. In a turnstile as set forth in claim 18, means for reversing the operation of said turnstile, wherein said first pair of doors are moved to a normally closed position to define an exit and said second pair of doors are moved to a normally open position to define an entrance, said reversing means including a reversing shaft that is operatively connected to said operating member and being vertically movable in response to the rotation of said operating member about the axis thereof, a reversing bracket operatively connected to said reversing shaft and vertically shiftable therewith, said returning means including a forward return spring and a reverse return spring, said forward return spring being connectable to said reversing bracket during forward operation of said turnstile and said reverse return spring being connectable to said reversing bracket during reverse operation of said turnstile, said reversing shaft being movable to shift the connection of said reversing bracket to either the forward or reverse return spring.

25. In apparatus for controlling access through a pay station, a first set of doors that are pivotally mounted and are normally disposed in an open position to define an entrance for said pay station, a second set of pivotally mounted doors that are normally closed and that define an exit for said pay station, means interconnecting said sets of doors so that the movement thereof is coordinated, an operating arm located between said sets of doors and normally disposed in the path of an approaching patron, said operating arm being operatively connected to said interconnecting means and being movable by said patron to open said normally closed doors and to close said normally open doors, and means for returning said doors to the normal position thereof upon release of said operating arm by said patron.

26. In apparatus as set forth in claim 25, a fare collecting device located adjacent said first set of doors on the entrance side of said turnstile and being adapted to receive a fare therein, means for locking said doors in the normal positions thereof, said locking means being operatively interconnected to said fare collecting device and responsive thereto for unlocking said doors when a predetermined fare is deposited in said fare collecting device.

27. In apparatus as set forth in claim 25, a pair of spaced apart base members, vertical supports mounted on said base members and cooperating with said doors to define an enclosure, a canopy mounted on said vertical supports and vertically spaced above said base members, said canopy enclosing said interconnecting means therein, said doors mounted between said base and canopy so as to define a high level barrier therewith, and means secured to said supports and doors intermediate the ends thereof for reducing the space in said enclosure so as to prevent more than one patron from entering said enclosure at one time.

28. In apparatus as set forth in claim 25, means for reversing the normal positions of said doors, so that said first set of doors is normally closed and defines the exit from said pay station, and said second set of doors is normally open and defines the entrance to said pay station.

29. In apparatus as set forth in claim 28, said reversing means including a reversing member operatively interconnected to said operating arm and being movable in response to axial rotation thereof, and a reversing bracket connected to said reversing member and movable therewith, said reversing bracket being interconnected to said returning means and being movable by said reversing member to reverse the operation of said returning means so that said first set of doors will return to the closed position thereof and said second set of doors will return to the open position thereof after a patron has passed through said pay station and has released said operating arm.

30. In apparatus as set forth in claim 28, a counter assembly including a forward counter for counting patron movement through said pay station in a forward direction, and a reverse counter for counting patron movement through said pay station in a reverse direction, said counter assembly being operatively interconnected to said interconnecting means and responsive to movement thereof for recording traffic flow through said pay station, said counter assembly being responsive to operation of said reversing means for locating the reverse or forward counter in counting position depending upon the direction of patron movement through said pay station.

31. In apparatus as set forth in claim 25, means for locking said doors in the normal positions thereof, means operatively interconnected to said locking means for releasing said locking means to unlock said doors so that a patron may pass through said pay station and means responsive to the returning movement of said doors for actuating said locking means for relocking them in the normal positions thereof after the patron has passed through said pay station.

32. In apparatus as set forth in claim 25, means for detecting the presence of a mass between said doors when both sets of said doors are located in the closed position thereof upon the return movement thereof and after the patron has passed through said pay station.

33. In a high level turnstile for use in controlling access through a pay station, a base secured to the floor of said pay station, a canopy assembly spaced from said base and located adjacent the ceiling of said pay station, a first set of doors pivotally mounted between said base and canopy assembly and being normally open to define an entrance to said turnstile, a second set of doors pivotally mounted between said base and canopy assembly and being normally closed to define an exit from said turnstile, means located in said canopy assembly and interconnected to said doors for controlling the pivotal movement thereof, an operating arm located in said turnstile between the sets of doors for contact by a patron passing through said turnstile and operatively connected to said controlling means for controlling the operation thereof, means in said canopy assembly for locking said controlling means in a predetermined position, wherein said first set of doors are open and said second set of doors are closed, and coin handling means located adjacent the entrance of said turnstile and electrically interconnected to said locking means for unlocking said locking means upon deposit of a predetermined fare therein, wherein said sets of doors are released for pivotal movement to enable a patron to pass through said turnstile, and means for returning said doors to the locked position thereof upon passage of said patron through said turnstile.

34. In a fare collection station, a fare collection machine, a turnstile located adjacent said fare collection machine including an entrance door assembly defined by a pair of pivotally mounted doors that are normally open and an exit door assembly defined by a pair of pivotally mounted doors that are normally closed, an operating mechanism located above said door assemblies and being interconnected to said door assemblies for coordinating the movement thereof, an operating arm positioned between said door assemblies and operatively connected to said operating mechanism so that movement of said operating arm by a patron passing through said turnstile causes said operating mechanism to produce a corresponding movement of said doors, means for locking said operating mechanism in a predetermined position wherein said entrance doors are open and said exit doors are closed, means responsive to the deposit of a preselected fare in said fare collection machine for releasing said locking means, wherein movement of said operating arm causes said exit doors to open and said entrance doors to close to permit the patron within said turnstile to exit therefrom, but preventing another patron from entering therein, and means for returning said exit doors to the normally closed position thereof and simultaneously returning said entrance doors to the normally open position thereof whereby the next approaching patron may enter the turnstile for passing therethrough upon deposit of said preselected fare in said fare collection machine.

35. In a turnstile, a first door assembly normally located in an open position with respect to the direction of patron movement through the turnstile, a second door assembly normally located in a closed position with respect to the direction of patron movement through the turnstile and cooperating with said first door assembly to define an enclosure into which a patron enters upon movement through the turnstile, means operatively connected to said door asesmblies for controlling movement thereof, and operating means projecting into said enclosure and engageable by a patron entering therein through the normally open first door assembly for operating said controlling means, wherein said first door assembly is moved to a closed position while said second door assembly remains closed so as to prevent trespassers from entering said enclosure, said second door assembly thereafter moving to an open position in response to continued movement of said patron against said operating means while said first door assembly remains closed, said patron thereby being permitted to exit from said enclosure through the open second door assembly, and means for returning said door assemblies to the normal positions after the patron has passed through the enclosure.

36. In a turnstile as set forth in claim 35, a base, a canopy assembly spaced from said base in vertical relation with respect thereto, said door assemblies being mounted for movement between said base and canopy assembly and spanning the space therebetween.

37. In a turnstile as set forth in claim 36, a fare collecting device located adjacent said turnstile on the entrance side of said first door assembly, said operating means including means for locking said door assemblies in the normal position thereof, said locking means being responsive to the deposit of a predetermined fare in said fare collection device for releasing said door assemblies from the locked position thereof.

38. In a turnstile as set forth in claim 36, means for reversing the normal positions of said door assemblies wherein said first door assembly is normally closed and said second door assembly is normally open.

39. In a turnstile as set forth in claim 36, said means for returning said door assemblies to the normal positions thereof comprising a spring assembly including a forward return spring and a reverse return spring, said forward return spring being operatively connected to the door assemblies for returning them to their normal positions when said first door assembly is utilized as the entrance area, said reverse return spring being operatively connected to the door assemblies when said second door assembly is utilized as the entrance area, and means for reversing the normal positions of said door assemblies wherein said first door assembly is normally closed and said second door assembly is normally open.

40. In a turnstile, a first door assembly normally located in an open position with respect to the direction of patron movement through the turnstile, a second door assembly spaced from said first door assembly to define an enclosure therewith and normally located in a closed position with respect to the direction of patron movement through the turnstile, means operatively connected to said door assemblies for controlling the movement thereof, wherein said first door assembly moves to a closed position while said second door assembly remains closed and said second door assembly thereafter moves to an open position while said first door assembly remains closed, means for returning said door assemblies to the normal positions thereof after a patron has passed through the enclosure, means for locking said door assemblies in the normal positions thereof, means for releasing said locking means so that a patron may pass through the enclosure and means responsive to the returning movement of said door assemblies for actuating said locking means wherein said locking means relocks said door assemblies in their normal positions after the patron has passed through the enclosure.

41. In a turnstile as set forth in claim 40, an operating arm operatively connected to said controlling means and extending into the enclosure for engagement by the patron upon entering the enclosure, whereupon the patron moves said operating arm to cause a corresponding movement of said controlling means and door assemblies, means for reversing the operation of said turnstile wherein said first door assembly is moved to a normally closed position and said second door assembly is moved to a normally open position, said reversing means being operatively connected to said operating arm and responsive to axial rotation thereof for effecting the reversing operation.

42. In a turnstile as set forth in claim 40, means for detecting the presence of a mass within said enclosure when said door assemblies are both in closed position upon the return movement thereof after the patron has passed through the enclosure.

43. In a turnstile as set forth in claim 40, a base construction, a canopy spaced above said base construction, said door assemblies being mounted between said base construction and canopy and substantially occupying the space therebetween, said controlling means positioned in said canopy above said door assemblies, and means in said canopy for affording easy access to said controlling means.

References Cited by the Examiner
UNITED STATES PATENTS

| | | | |
|---|---|---|---|
| 188,437 | 3/77 | Swan | 39—3 |
| 220,624 | 10/79 | Jorgensen | 39—2 |
| 460,719 | 10/91 | Gajardo | 39—2 |
| 1,086,315 | 2/14 | Davis | 39—2 |
| 1,606,782 | 11/26 | Hedley | 39—3 |
| 2,309,893 | 2/43 | Gersbach | 39—3 |

HARRISON R. MOSELEY, *Primary Examiner.*

REINALDO P. MACHADO, *Examiner.*